US011196712B1

(12) United States Patent
Norbutas

(10) Patent No.: US 11,196,712 B1
(45) Date of Patent: Dec. 7, 2021

(54) PROXY SCRAPER DETECTOR

(71) Applicant: Teso LT, UAB, Vilnius (LT)

(72) Inventor: Emanuelis Norbutas, Vilnius (LT)

(73) Assignee: Teso LT, UAB, Vilnius (LT)

( * ) Notice: Subject to any disclaimer, the term of this patent is extended or adjusted under 35 U.S.C. 154(b) by 0 days.

(21) Appl. No.: 17/136,879

(22) Filed: Dec. 29, 2020

(51) Int. Cl.
*H04L 29/06* (2006.01)
*H04L 29/08* (2006.01)
*H04L 12/26* (2006.01)

(52) U.S. Cl.
CPC ...... *H04L 63/0281* (2013.01); *H04L 43/0864* (2013.01); *H04L 43/10* (2013.01); *H04L 67/02* (2013.01)

(58) Field of Classification Search
None
See application file for complete search history.

(56) References Cited

U.S. PATENT DOCUMENTS

2017/0012988 A1* 1/2017 Turgeman ............. H04L 63/102

* cited by examiner

*Primary Examiner* — Minh Chau Nguyen
*Assistant Examiner* — Ishrat Rashid
(74) *Attorney, Agent, or Firm* — FisherBroyles, LLP; Keats Quinalty

(57) ABSTRACT

The method and system detects if proxies are used by a user from a web server's side. The method and system uses HTTP/2 and HTTP/3 protocols and, more precisely, the ping frames to test the round trip time of messages between a web server and a user. At the same time, a web server uses an Internet Control Message Protocol echo requests to measure the round trip time to an IP address. A web server can then compare, aggregate, and analyze different round trip times and determine if they are coming from different sources, i.e. if a user is using a proxy server. A web server can make decisions based on the comparison of round trip times. For example, a difference in a single user's round trip times may trigger a restrictive user policy at the web server's end and a web server can decide to return the requested content, return an error message, or ban them and similarly limit services.

19 Claims, 14 Drawing Sheets

PROXY SCRAPER DETECTOR

FIELD

In one aspect, the embodiments detailed herewithin relate to proxy server identification method and device, network communication security, and preventing web scraping.

BACKGROUND

Proxy servers are intermediate servers that accept requests from users and forward the requests to other proxy servers, a source server, or service the request from their own cache. Proxy servers are computing devices connected to a network that serve as intermediaries for customer computing devices, requesting services or data from "network resources", accepting the requests from customers proxy servers and either forwarding the request to another proxy, redirecting to the requested resource, or serving the request from their own cache, located locally or remotely, or distributed across multiple systems.

The proxy is also called 'server' or 'gateway'. A proxy allows users on a network to browse the Web, send files over File Transfer Protocol (FTP), and work with e-mail and other Internet services. In one aspect, a proxy operates in the following manner: i) receives a request from a user in a public network, or private network separated by a firewall, to a remote server that contains the desired content; ii) creates a proxy tunnel toward the remote server; iii) forwards the request to the remote server through the established tunnel; iv) receives the response from the remote server; and v) forwards the response back to the user.

The proxies can be divided into different types depending on what functions are provided or what servers are used. The proxies can also be divided into residential internet protocol (IP) proxies, datacenter IP proxies, and mobile IP proxies. A residential IP proxy is an IP address linked to a physical device, for example, mobile phone or desktop computer. The real owners of the residential IP proxies, namely, Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies not by individuals. The datacenter proxies are actually IP addresses that are not located in a household. Instead, the datacenter proxies are associated with a commercial datacenter. Mobile IP proxies act similar to residential proxies in that they are assigned their IP address by a mobile operator from a pool of IP addresses designated to mobile users. Mobile IP proxies use mobile data, as opposed to a residential proxy that uses broadband ISP connectivity.

A proxy server is basically a computer on the internet with its own IP address that the user's computer "knows". When a user sends a web request, the request is sent to the proxy server first. The proxy server then makes the web request on the user's behalf, collects the response from the web server, and forwards the web page data so that the user can see the page in the browser or in another manner e.g. as data written in a file on the disk for bulk processing by data aggregation and analysis tools. When the proxy server forwards the web requests, the proxy server can make changes to the data but yet provide the data requested. For example, a proxy server can change the user's IP address, so the web server is not provided the geographical location of the user. Also, a proxy server can block access to certain web pages, based on IP address or domain name.

Modern proxy servers do much more than simply forwarding web requests. For example, modern proxy servers can perform several additional functions to increase data security and network performance. Proxy servers can act as a firewall and web filter, provide shared network connections, and cache data to speed up common requests. Proxy servers can provide a high level of privacy. Proxy servers can change the IP address and other identifying information the web request contains (e.g., so that the destination server does not know who made the original request). Proxy servers can also be used to control internet usage of employees and children (e.g., organizations and parents set up proxy servers to control and monitor how their employees or kids use the Internet) or improve browsing speeds and save bandwidth (e.g., proxy servers can cache (save a copy of the appropriate website data locally) popular websites and, when a request is made, will send the saved copy to the user).

Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example a United States (US) webpage, but they do not have access from their home country, they can make the request through a proxy server that is located in the US (and has a US IP address). Using proxy services, the user's traffic seems to be coming from the US IP address. Proxies can also be used for web scraping, data mining, and other similar tasks.

Data gathering from the web is an important and often vital task for many business domains. The importance and value of data is ever-increasing and therefore the need for more efficient tools of data retrieval and analysis is growing. The two main tools for accessing data sources on the web are web crawling and web scraping.

The general purpose of web crawling is to access publicly available web resources (usually web pages), retrieve their content, and forward the content to the user. The basic purpose of web scraping is to analyze the data retrieved by the web crawler and extract information requested by the user.

A web crawler (also known as a web spider, bot) is a program or automated script which navigates the web in a methodical, automated manner. Its primary task is to gather the information ordered by the user. The web crawler does so by browsing the web for the requested info and retrieving raw Hypertext Markup Language (HTML) code of the accessed web sites. Another purpose of utilizing web crawling is the indexing of web content by search engines.

Web scraping (also known as web harvesting, web data extraction) is a process of fetching the accessed web pages and parsing the content for the requested data. Web scraping can be done manually by hand, but typically comprises automated processes implemented using a web crawler.

Web crawling and web scraping tools are often used together as the scraping functionality heavily depends on web crawling results. More specifically, web crawling is a main component of web scraping. Data accessed and fetched by a web crawler is then processed by a web scraper which analyses the fetched content and extracts the required data.

The operation of a web crawler undergoes a sequence of tasks including taking in the request, gathering data, and delivering data. More specifically, the tasks of a web crawler include: accepting the request from the user; managing the request queue; balancing the load between processing services; attempting to retrieve the requested data; data storage;

and data delivery. The task of attempting data retrieval further includes managing Hypertext Transfer Protocol (HTTP) and Hypertext Transfer Protocol Secure (HTTPS) requests, rotating proxies, and headers.

A web crawler uses a standard HTTP/HTTPS request/response model to call and access targets. This model describes the user-server communication via the web. A user sends an HTTP request to the server asking for access to specific data. A server sends an HTTP response back to the user with the requested data. The HTTP request indicates the target Uniform Resource Locator (URL), the access method, and the headers. The HTTP response returns status information, the headers, and the requested data.

HTTP messages are sent across the internet unencrypted and therefore are readable by any party that sees the message as it is routed to its destination. The internet provides no control of how messages are routed. Because HTTP is plain-text, messages can be intercepted, read, and even altered en route.

HTTPS is the secure version of HTTP that encrypts messages in transit by using the Transport Layer Security (TLS) protocol, also known as Secure Sockets Layer (SSL).

HTTPS works by using public key encryption, which allows servers to provide public keys in the form of digital certificates when users first connect. The browser encrypts messages by using this public key, which only the server can decrypt, as only it has the corresponding private key. This system allows a user to communicate securely with a website without having to know a shared secret key in advance.

The digital certificates are issued, and digitally signed, by various certificate authorities (CAs) trusted by the browser, which is why it is possible to authenticate that the public key is for the server connected to. HTTPS connections go through a protocol-negotiation stage to set up the connection, as they need to agree on the SSL/TLS protocol, cipher, and various other settings to use before the connection is established and HTTP messages are exchanged. This stage is flexible, allowing new HTTPS protocols and ciphers to be introduced and used only when both user and server agree to use them.

Using HTTPS means using SSL/TLS to encrypt a standard HTTP connection. Public-private key encryption is known as asymmetric encryption because it uses different keys to encrypt and decrypt messages. This type of encryption is needed to allow secure communication to a server never connected to before. This agreement happens during the TLS handshake, which occurs at the beginning of the connection.

In addition to being used to agree on the symmetric encryption key to be used, public-private key cryptography is used to confirm identity. Identity is confirmed as messages are signed by the server's hidden private key, which can be unlocked with the public key in the certificate. Each SSL/TLS certificate is also cryptographically signed by a recognized certificate authority that the computer trusts. If user certificates are being used, a similar process works in reverse. With regard to identity, all that can be confirmed is that the server domain it is part of signed the SSL/TLS certificate.

Web applications employ the TLS protocol to secure HTTP communication (i.e., HTTP over TLS, or HTTPS) between a user's browser and the web server. TLS enables users to securely access and interact with their online accounts, and protects, among other things, common user authentication credentials, such as passwords and cookies. Such credentials are considered weak; they are transmitted over the network and are vulnerable unless protected by TLS. However, if an intermediary successfully impersonates the server to the user, it can transparently intercept HTTPS traffic.

This method is known as TLS Man-In-The-Middle (MITM). TLS server authentication is commonly achieved through the use of server certificates. A server certificate binds a public key to the identity of a server, designating that this server holds the corresponding private key. The browser accepts a certificate if it bears the signature of any trusted Certificate Authority (CA). Browsers are typically configured to trust hundreds of CAs. An intermediary can thus successfully impersonate a legitimate server to the browser by presenting a valid certificate for that server, as long as it holds the corresponding private key HTTPS is hosted on a different port by default (port 443 as opposed to port 80 for standard HTTP), and it has a different URL scheme (https:// as opposed to http://), but it does not fundamentally alter the way HTTP is used in terms of syntax or message format except for the encryption and decryption itself.

After the HTTPS session is set up, standard HTTP messages are exchanged. The user and server encrypt these messages before sending and decrypt upon receipt.

When communication begins between a user and a server, HTTP/1—version 1.1 of the HTTP protocol—faces performance issues because it blocks on a send and waits for a response. In other words, it is synchronous—it cannot move on to another HTTP/1 request until the current request is finished. If a network or a server is slow, HTTP performs worse. As HTTP is intended primarily to request resources from a server that is often far from the user, network slowness is relevant to HTTP. As web pages grow and become more complex, slowness is a prominent problem.

HTTP/2—version 2 of the HTTP protocol—was created specifically to address performance problems in HTTP/1, and the new version of the protocol differs by adding the following concepts:

Binary rather than textual protocol
Multiplexed rather than synchronous connection
Flow control
Stream prioritization
Server-push Most importantly, HTTP/1 is a synchronous, single request-and-response protocol. The user sends an HTTP/1 message to a server and gets an HTTP/1 response back. HTTP/2 allows multiple requests to be in progress at the same time, on a single connection, using different streams for each HTTP request or response. This concept of multiple independent requests happening at the same time was made possible by moving to a binary framing layer, where each frame has a stream identifier. The receiving party can reconstruct the full message when all frames for that stream have been received.

Frames are essential to allowing multiple messages to be sent at the same time. Each frame is labeled to indicate which message it belongs to, which allows two, three, or a hundred messages to be sent or received at the same time on the same multiplexed connection, as opposed to the six parallel HTTP/1 connections that most browsers allow.

Currently, 14 frame types have been defined for HTTP/2:
DATA (0x10)
HEADERS (0x1)
PRIORITY (0x2)
RST_STREAM (0x3)
SETTINGS (0x4)
PUSH_PROMISE (0x5)

PING (0x6)
GOAWAY (0x7)
WINDOW_UPDATE (0x8)
CONTINUATION (0x9)
ALTSVC (0xa)
ORIGIN (0xc)
CACHE_DIGEST (proposed)

The PING frame (0x6) is used to measure a round trip from the sender and can also be used to keep an otherwise-unused connection alive. When a host receives this frame, they should immediately respond with a similar PING frame. Both PING frames should be sent only on the control stream (stream ID 0). The PING frame defines one flag (ACK (0x1)) that can be set in the common frame header. ACK (0x1) should not be set in the initial PING frame, but it should be set on the returning PING frame.

HTTP/2 uses stream prioritization so that the most critical resources—like ping messages—can be sent with higher priority. Stream prioritization is implemented by the server sending more frames for higher-priority requests than for lower-priority requests when a queue of frames is waiting to be sent. Stream prioritization also allows greater control than under HTTP/1, in which the separate connections are independent. In HTTP/1, other than not using a connection, it is not possible to prioritize certain connections.

Another important difference between HTTP/1 and HTTP/2 is that HTTP/2 adds the concept of server-push, which allows the server to respond to a request with more than one response. Under HTTP/1, when the home page is returned, the browser must read it and then request the other resources before it starts rendering the page. With HTTP/2 server-push, those resources can be sent with the initial response and should be available when the browser looks to use them.

HTTP/2 is available over unencrypted HTTP, in which it is known as h2c, and over encrypted HTTPS, in which it is known as h2. In practice, all web browsers support HTTP/2 only over HTTPS (h2), so it is used to negotiate HTTP/2 by web browsers. Server-to-server HTTP/2 communication can be over unencrypted HTTP (h2c) or HTTPS (h2).

There is another attempt to improve on the performance of HTTP/1, that is HTTP/3. Although both HTTP/1 and HTTP/2 build on TCP protocol, HTTP/3 uses a UDP-based framework known as QUIC.

QUIC is a UDP-based protocol that aims to replace TCP and other parts of the traditional HTTP stack to address many of its inefficiencies. HTTP/2 introduced some TCP-like concepts (such as packets and flow control), but QUIC replaced TCP with UDP and thus is considered a new kind of HTTP protocol—HTTP/3. QUIC is meant to replace most of what TCP traditionally provides (the setup, reliability, and congestion control parts), all of HTTPS (to improve the setup delays), and even part of HTTP/2 (the flow control and header compression parts).

QUIC or HTTP/3—version 3 of the HTTP protocol—takes over some of the Transport layer functionalities, leaving a lighter HTTP/2 implementation running on top. QUIC is based on the User Datagram Protocol (UPD), which is a light protocol compared with TCP, but is similarly built on top of Internet Protocol (IP). TCP implements reliability in IP for the network connection, including retransmission, congestion, and flow control. These features normally are necessary, but in HTTP/2, they introduce inefficiencies.

UDP is basic compared with TCP. It has the concept of ports, similar to that of TCP, so several UDP-based services can run on the same computer. It also has an optional checksum so that the integrity of UDP packets can be checked. Reliability, ordering, and congestion control do not exist, and can be built by the application. If a UDP packet is lost, it will not automatically be resent. If a UDP packet arrives out of order, it is still seen by the higher-level application. UDP was originally used for applications that did not need delivery guarantees (such as video, in which some frames could be dropped without too much loss in service). UDP is also perfect for a multiplexed protocol such as HTTP/2 if that higher-level protocol wants to implement better solutions to these problems than those available in TCP.

In QUIC, some of the Transport layer protocols' frames are removed from the HTTP/2 layer (such as PING and WINDOW_UPDATE frames) and moved to the core QUIC-Transport layer, which is not HTTP-specific. Thus, using HTTP/3 any host can also perform a ping through QUIC.

In contrast to HTTP/1, HTTP/2 and HTTP/3 QUIC protocols provide the possibility to any hosts (for example, a user and web server) to perform ping operations. It is possible because HTTP/2 and HTTP/3 are not synchronous and are able to prioritize streams over a multiplexed connection. This means that in HTTP/2 and HTTP/3 a web server has the ability to initiate server-side communication to other hosts and prioritize it.

Generally, a web server is a combination of hardware and software that uses HTTP and other protocols to respond to user requests made over the Internet. On the hardware side, a web server can comprise a computer that stores web server software and a website's content files (for example, HTML documents, images, CSS stylesheets, and JavaScript files). On the software side, a web server includes several parts that control how web users access hosted files. A web server can be accessed through the domain names of the websites it stores, and it delivers the content of these hosted websites to the end user's device. Therefore, in simple terms, the primary responsibility of a web server is to display website contents through storing, processing, and delivering web contents to end-users.

The communication with a web server can be initiated by the end-user, generally through a web browser by requesting a specific resource using HTTP. The web server responds by sending the content of that specific resource to the web browser, also via HTTP, or an error message. While the fundamental function of a web server is to serve content, full implementation of HTTP also includes ways of receiving content from clients. This feature is used for submitting web forms, including uploading of files. Besides HTTP, web servers can also support SMTP (Simple Mail Transfer Protocol) and FTP (File Transfer Protocol).

Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by writing a program that queries a web server and requests data automatically, then parses the data to extract the requested information.

Web scrapers—programs written for web scraping—can have a significant advantage over other means of accessing information, like web browsers. The latter are designed to present the information in a readable way for humans, whereas web scrapers are excellent at collecting and processing large amounts of data quickly. Rather than opening one page at a time through a monitor (as web browsers do), web scrapers are able to view large databases comprising thousands or even millions of pages at once.

Sometimes the website allows another automated way to transfer its structured data from one program to another via an API. Typically, a program will make a request to an API via HTTP for some type of data, and the API will return this data from the website in the structured form. It serves as a medium to transfer the data. However, using APIs is not considered web scraping since the API is offered by the website (or a third party) and it removes the need for web scrapers.

An API can transfer well-formatted data from one program to another and the process of using it is easier than building a web scraper (a bot) to get the same data. However, APIs are not always available for the needed data. Also, APIs often use volume and rate restrictions and limit the types and the format of the data. Thus, a user would use web scraping for the data for which an API does not exist or which is restricted in any way by the API.

Usually, web scraping includes the following steps: retrieving Hypertext Markup Language (HTML) data from a website; parsing the data for target information; saving target information; repeating the process if needed on another page. A program that is designed to do all of these steps is called a web scraper. A related program—a web crawler (also known as a web spider)—is a program or an automated script which performs the first task, i.e. it navigates the web in an automated manner to retrieve raw HTML data of the accessed web sites (the process also known as indexing).

There are techniques that websites use to stop or slow down a bot since scraping may overload the website. For example, they may try to identify the IP address of the bot and block it to prevent further access by the bot. To do that, the website needs to identify the bot-like behavior of the web scraper and to identify its IP address.

Recognizing the bot-like behavior can be done in multiple ways. One involves a limit on the rate of actions (or actions over time) since humans normally perform less actions than a bot would. To circumvent this, web scrapers often choose to employ proxies which mask the real IP address of the web scraper and perform web scraping through multiple proxy IP addresses at the same time to both keep up the gathering speed and avoid being blocked.

To solve at least these problems, in one aspect, the present embodiments detailed herein detect if proxies are used by a user from a web server's side. One method of the embodiments uses HTTP/2 and HTTP/3 protocols and, more precisely, the ping frames to test the round trip time (RTT) of messages between a web server and a user. At the same time, a server uses an Internet Control Message Protocol (ICMP) ping message to measure the RTT to an IP address. A web server can then compare, aggregate, and analyze different RTTs and determine if they are coming from different sources, i.e. if a user is using a proxy server. A web server can make decisions based on the comparison of RTTs. For example, a single user's different RTTs may trigger a restrictive user policy at web server's end and a web server can decide to log the user out, require to perform CAPTCHAs (Completely Automated Public Turing test to tell Computers and Humans Apart), put them on a blacklist at the firewall, and similarly limit services.

SUMMARY

HTTP/2 and HTTP/3 allow a web server to ping its users and users must ping back as a first priority. This allows a web server to register a RTT between "ping sent" and "pong received" or similar timestamps. In other words, it allows a web server to determine how much time it takes for the message to reach a user and get back. Both HTTP/2 and HTTP/3 are encrypted protocols, meaning that transparent proxies, which do not decrypt messages, have no way of knowing that certain messages are ping or pong messages. Thus, a ping message will be received at the point at which encryption terminates, which is the application of the web browser or scraper that is accessing the content. In other words, HTTP/2 and HTTP/3 pings reach its ultimate destination that is able to read the message. And proxies, by definition, are not ultimate destinations. They are transparent mediums that transfer messages without reading them.

A web server has another mechanism available to it to determine the RTT between it and the IP address making a request. This is done through a network layer ICMP. This type of ping will terminate at the IP address visible to a web server which will be the IP address of a proxy server, if it is used.

If a user is using a proxy, their ICMP and HTTP/2 or HTTP/3 QUIC ping RTTs will be significantly different because the HTTP/2 or HTTP/3 QUIC ping will reach its ultimate destination and ICMP ping will only reach a proxy. Otherwise, if a user is not using a proxy server, their ICMP and HTTP/2 or HTTP/3 QUIC ping RTTs will be virtually the same, especially if accounted for the time it takes to decrypt and encrypt messages.

A web server can make both types of ping messages, await for the response, and compare their round trip times. A web server can also collect this type of data about the differences in RTTs, it can aggregate and analyse it and make conclusions about whether a user is browsing through a proxy server. Various policies can be subsequently implemented by a web server to mitigate the usage of proxy servers.

For example, a web server can choose to further enquire into a user agent or HTTP headers of the request. It can also choose to allocate lower priority to requests made from users employing proxy servers. It can choose to respond with a CAPTCHA request or an HTTP error message. It can also choose to ban a user employing a proxy. Ultimately, it can blacklist an IP address associated with the proxy server at its firewall. Such and similar policies are use cases enabled by the initial detection of proxy server usage. Detection of proxy server usage is the primary purpose of the embodiments disclosed herein.

DETAILED DESCRIPTION

Figure 1:
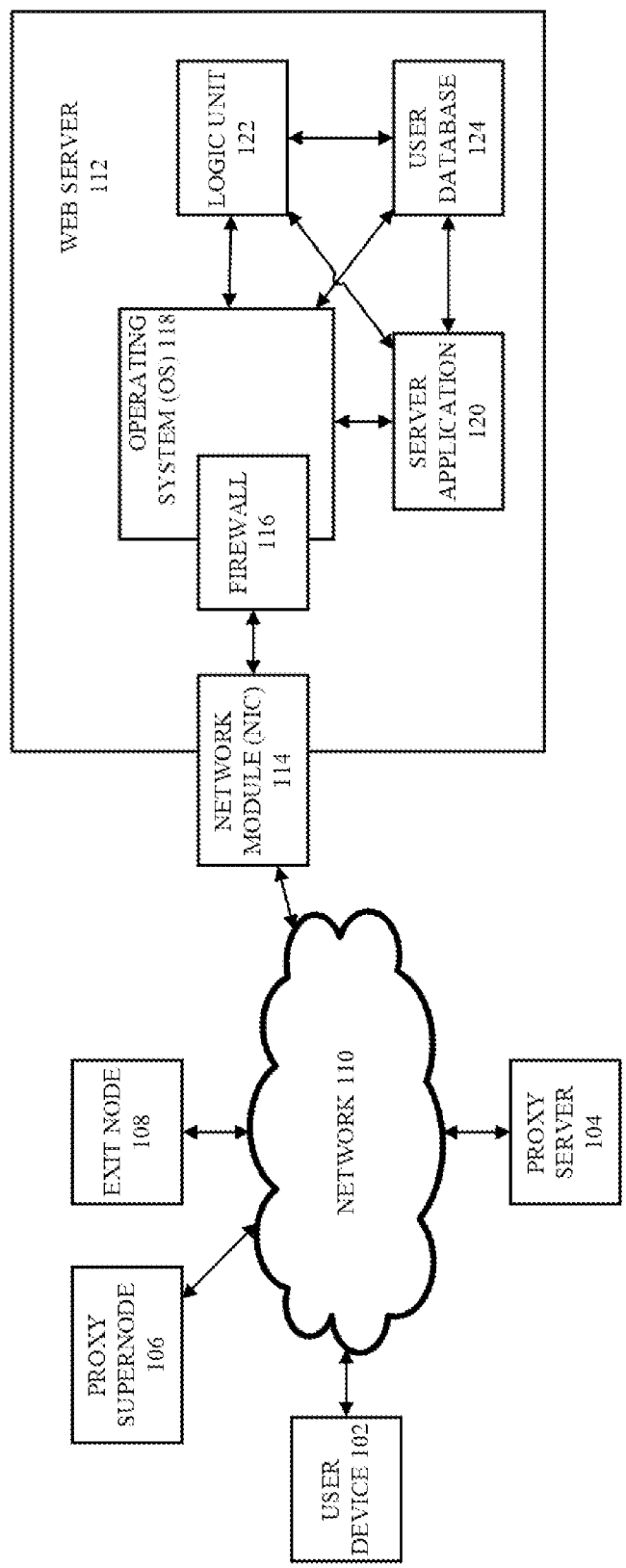
FIG. 1 shows a block diagram of an exemplary architectural depiction of components.

There are several problems associated with web scraping and web server load. First, web servers have a limit in the load capacity that they are able to service at one time. Also, they have costs associated with hosting content online and servicing traffic. Thus, web servers are interested in primarily servicing human users. Human users are such that they do not perform automated actions. For that purpose web servers often limit the amount of actions that a user might perform on a web server in a period of time.

However, non-human scrapers employ proxies to hide the fact of automated content extraction. Scrapers distribute their actions through multiple proxies and thus reduce the amount of actions taken through a single proxy server. From a web server's perspective, it appears that a proxy is a human user because it stays within the limit of the rate of actions. There are other measures that a web server can take to try to detect scraping activities, like analyzing the HTTP headers and web cookies of a user to determine whether it really looks like a human user. But scrapers again take countermeasures to build human-like user agents to make the requests look like human generated traffic.

Thus, the embodiments presented herein focus on the very fact that proxies are used in scraping activities. If a web server detects that proxies are used, it can take a more conservative approach to a user and make extra queries or take extra precautions towards them. A web server can also choose to blacklist a user using a proxy. However, for that to be possible web servers must be able to detect whether a user is using a proxy. The embodiments disclosed herein enable web servers to detect proxy usage.

No reliable techniques exist to detect proxies in HTTP/1 since it is synchronous and only allows one response from a server to one request from a user on a single TCP connection. There can be multiple TCP connections open in HTTP/1 at the same time but individually they remain synchronous. Thus, a web server can hardly make any tests or queries to a user.

Queries from a web server can be made in HTTP/2 and HTTP/3. An HTTP/2 connection operates within a single TCP connection with multiple streams open. Once a stream is open and a user makes a first request, a web server can respond with multiple responses through the stream. This greatly reduces the influence of latency to the loading speed of web pages since less messages have to be exchanged to receive the content. There is a framing layer in HTTP/2 that orders and prioritizes frames sent through a stream, so that they can be properly ordered in a non-synchronous environment. One of the frames is a ping frame that must be prioritized to all other communications. It means that the ping frame is sent first and must receive the first response that is described in HTTP/2. HTTP/3 likewise has the ability to use ping functionality as part of the QUIC framework.

A web server can initiate ICMP and HTTP/2 or HTTP/3 QUIC ping messages, await for the response, and compare their round trip times.

Some general terminology descriptions may be helpful and are included herein for convenience and are intended to be interpreted in the broadest possible interpretation.

User Device 102—a user device can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for connecting to a proxy server.

Proxy Server 104—an exemplary proxy server (computer system or systems, or applications) that act as an intermediary for requests from users seeking resources from other servers. A user connects to the proxy server, requesting some service, such as a file, a connection, a web page, or other resources available from a different server. The proxy server forwards the request through to the actual target resource, or resources, containing the actual content. After obtaining the content, the proxy server normally forwards the content to the original requestor, but other actions by the proxy (e.g. return error message) can also be performed. In the presented embodiments, a proxy server may not have full visibility into the actual content fetched for the original requestor, e.g. in case of an encrypted HTTPS session, if the proxy is not the decrypting end-point, the proxy serves as an intermediary blindly forwarding the data without being aware of what is being forwarded. However, it should be noted that the metadata of the response, e.g. HTTP headers are always visible. This functionality is necessary for the proxy to correctly forward the data obtained to the correct requesting party—the end user or the mediating proxy device.

Proxy Supernode 106—can be a proxy service provider infrastructure that communicates with both the User's Device 102 that sends requests to it and with Exit Node 108 that ultimately services these requests.

Exit Node 108—is a last gateway where the traffic hits the Internet. There can be several proxies used to perform a user's request (like a Proxy Supernode 106 and an Exit Node 108), but the Exit node 108 is the final proxy that contacts the target and retrieves the information from the target. There can be several proxies serving the user's request, forming a proxy chain, passing the request through each proxy, with the Exit node 108 being the last link in the chain that ultimately passes the request to the target. The functionality of an Exit Node 108 cam be similar or identical to that of Proxy Server 104.

Network 110—is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Web Server 112—is server software or hardware unit that can receive and respond to User Device 102 requests over the Network 110. A web server can, in general, contain one or more websites. A web server processes incoming network requests over HTTP/1 and HTTP/2 or HTTP/3 and several other protocols. The primary function of a web server is to store, process and deliver web pages to users.

In at least one embodiment, the following components are part of a Web Server 112: Network Module (NIC) 114, Firewall 116, Operating System (OS) 118, Server Application 120, Logic Unit 122, and User Database 124. NIC 114 is the component of an exemplary Web Server 112 that communicates directly with Network 110, and thus with the remaining external agents. Firewall 116 is the component that communicates with NIC 114, so that all traffic should go through Firewall 116.

NIC 114, or Network Interface Controller—is a Web Server 118 hardware component that connects Web Server 112 to Network 110.

Firewall 116—a Web Server 118 device or piece of software that examines all traffic going in or out of a network (through NIC 114) and uses a preconfigured set of rules to determine whether or not that data is allowed to pass. Firewalls can either be a dedicated piece of hardware or simply software running on a system. Packets could be filtered by protocol, IP address, or MAC address. Packets must conform to a set of rules in order to pass. Either a preconfigured set of default rules can be used or an administrator can set a specific group of rules. Any packet that does not follow all the rules gets blocked. Firewalls can incorporate stateful packet filtering. This technology incorporates the same levels of packet filtering but also examines the status of the connection. This allows the firewall device to determine if a particular connection is identical to the one it allowed to originate. Most often, an OS 118 incorporates some form of software-level firewall in its design.

Operating System (OS) 118—is an application running on a Web Server 118 that manages all of the services required by applications (like Server Application 120) that are to run on the system and interfaces with the hardware (like NIC 114).

Server Application 120—is software on a Web Server 118 that provides functionality for User Device 102. Server Application 120 communicates with Logic Unit 122, User Database 124, and Operating System (OS) 118. This architecture in which Server Application 120 serves User Device 102 is known as a user-server model. Servers can provide various functionalities, often called "services", such as sharing data or resources among multiple users, or performing computation for User Device 102. A single server can serve multiple users. A user can connect over a network to a Web Server 118. User Device 102 sends a request to Web Server 118, which performs some action and sends a response back to the user, typically with a result or acknowledgment. Server Application 120 can initiate ICMP pings through OS 118. Additionally, in HTTP/2 and HTTP/3 protocols Web Server 118 can initiate server-push requests that originate on the Web Server 118 side. An example of such a request is a HTTP/2 PING frame which requests User Device 102 to respond with a HTTP/2 PING ACK frame.

Logic Unit 122—it is a processing unit within Web Server 118 that communicates with Server Application 120, User Database 124, and Operating System (OS) 118. Logic Unit 122 is primarily responsible for analyzing (processing) information about ping RTT times and User Device 102 requests. Examples of processing operations include but are not limited to grouping data in categories, forming series of data (ordered, partially ordered or unordered), aggregating data, extracting aggregated results, performing statistical analysis, running machine learning and deep learning algorithms, forming predictive models, and other processing functions.

User Database 124—is a memory storage that stores information about User Device 102. Some exemplary parameters stored in this database include but are not limited to IP address, IP type, consent to terms of services, dynamic parameters (time seen, session duration and timestamps, timestamps of idle connection, current total traffic, traffic per day or other period of time, ICMP ping RTT, HTTP/2 ping RTT, HTTP/2 ping RTT, and others), and aggregated dynamic parameters over any period of time (average ICMP ping RTT, average HTTP/2 ping RTT, average HTTP/2 ping RTT, average session duration and timestamps, average traffic, variations in which median and percentile groups are used instead of average values, and others) in any combination and with any weights associated with the parameters.

ICMP ping—is a networking application used to test whether a particular host at an IP address is up and reachable. ICMP ping is also used to measure latency between the client host and the target host. It works by sending ICMP "echo request" packets (i.e. ping packets) to the target host and listening for ICMP "echo response" replies (i.e. pong packets). Upon receiving echo responses Web Server 118 measures the RRT, records packet loss, and calculates a statistical summary of multiple ping-pong exchanges (the minimum, mean, max, standard deviation, and other aggregations of RTTs). Using ICMP ping, Web Server 118 can test an IP address from which an HTTP request is originating. The IP address visible to Web Server 118 will be that of a last-mile or exit node device, be it User Device 102, Proxy Server 104, or Exit Node 108.

HTTP/2 ping—is a ping frame (0x6) within HTTP/2. The ping frame is a mechanism for measuring a minimal round-trip time from the sender, as well as determining whether an idle connection is still functional. Ping frames can be sent from any endpoint. In addition to the frame header, ping frames must contain 8 octets of opaque data in the payload. A sender can include any value it chooses and use those octets in any fashion. Receivers of a ping frame that does not include an ACK flag must send a ping frame with the ACK flag set in response, with an identical payload. Ping responses should be given higher priority than any other frame. Ping frame is used to measure a round trip from the sender and can also be used to keep an otherwise-unused connection alive. When it receives this frame, the receiver should immediately respond with a similar ping frame. Both ping frames should be sent only on the control stream (stream ID 0). The ping frame defines one flag that can be set in the common frame header. ACK (0x1) should not be set in the initial ping frame, but it should be set on the returning ping frame. HTTP/2 ping is formatted in the Opaque Data field and has a length of 64 bits (8 octets). The same data is to be sent in the returning ping request. Using HTTP/2 ping, Web Server 118 can test a RTT to an application at which TLS encryption terminates. TLS encryption will terminate at User Device 102 which contains the browser or other application, used to access Web Server 118.

HTTP/3 QUIC ping—is a ping frame (0x07) within QUIC (used by HTTP/3). Both endpoints can use HTTP/3 QUIC ping frames to verify that their peers are still alive or to check reachability of the peer. Differently from an HTTP/2 ping frame, the HTTP/3 QUIC ping frame contains a variable-length payload. A HTTP/3 QUIC ping frame with an empty Data field causes the packet containing it to be received without any need to respond. An empty HTTP/3 QUIC ping frame can be used to keep a connection alive when an application or application protocol wishes to prevent the connection from timing out. If the data field is not empty, the recipient of this frame must generate a pong frame containing the same data. A pong frame is a reply to a ping frame, similar to a HTTP/2 ping frame with an ACK flag. Thus, a HTTP/3 QUIC ping frame with data functions similarly to a HTTP/2 ping frame. Thus, using QUIC ping, Web Server 118 can also test a RTT to User Device 102 which contains the browser or other application accessing Web Server 118.

In one aspect, one of the embodiments described herein provides systems and methods for determining by Web Server 112 whether or not User Device 102 is connecting directly or by using a Proxy Server 104 or Proxy Supernode 106 and Exit Node 108. Web Server 112 determines this by making ICMP ping and HTTP/2 or HTTP/3 QUIC ping and comparing their RTT. If User Device 102 is not using any proxy to connect, these RTTs will be identical or close to identical. If User Device 102 is in fact using a proxy, ICMP ping RTT will be shorter (terminating at the Proxy Server 104 or Exit Node 108) than HTTP/2 ping or HTTP/3 QUIC ping RTT that will terminate at User Device 102 where TLS encryption ends.

In another aspect, one of the embodiments described herein provides systems and methods for storing different types of RTTs by Web Server 112, aggregating them over any period of time (average ICMP ping RTT, average HTTP/2 ping RTT, average HTTP/2 ping RTT, average session duration and timestamps, average traffic, variations in which median and percentile groups are used instead of average values, and others) in any combination and with any weights associated with the parameters. The embodiments described herein can also compensate for encryption time that is involved in TLS connections to achieve a comparable ping RTT to ICMP ping. All of the stored values can be used for an aggregated RTT comparison at Web Server 112 where not only single values are considered but also values over time.

In yet another aspect, one of the embodiments described herein provides systems and methods for making decisions by Web Server 112 based on the fact that User Device 102 is connecting directly or through a proxy. Web Server 112 can decide to react by returning requested response, returning error message, blacklisting Proxy Server 104 or Exit Node 108 IP address at Firewall 116, adjusting service level, dropping connection, requesting CAPTCHA, and other similar responses.

FIG. 1 shows an exemplary overall structure that comprises a User Device 102, which can be any computing device (e.g., a personal computer, mobile phone, a tablet computer) having access to Network 110 (e.g. Internet connection), a Proxy Server 104, a Proxy Supernode 106 and Exit Node 108, and a Web Server 112, containing NIC 114, Firewall 116, OS 118, Server Application 120, Logic Unit 122, and User Database 124. While the elements shown in the FIG. 1 implement the exemplary embodiment, some elements in other embodiments can have different titles or can be combined into a single element instead of two separate elements (for example, Logic Unit 122 can be combined with Server Application 120 as a single infrastructure component). However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure.

In FIG. 1, User Device 102, Proxy Server 104, Proxy Supernode 106, Exit Node 108, and Web Server 112 are connecting to Network 110 to reach each other. The connection can begin from User Device 102 with the target being Web Server 112. Once the connection is initiated, Web Server 112 can respond to User Device 102 requests and server-push certain data, like ping frames. In the current embodiments, the communication between User Device 102 and Web Server 112 is taking place either through HTTP/2 or HTTP/3 (on the basis of QUIC).

User Device 102 can connect directly to Web Server 112 through Network 110. However, User Device 102 can also use proxies to connect to Web Server 112. If proxies are used, User Device 102 can connect to Proxy Server 104 through Network 110 and then Proxy Server 104 will forward the connection to Web Server 112. In this case, User Device 102 already knows the Proxy Server 104 it wants to use and rallies its connection through it. However, User Device 102 can also choose to use a proxy service provider, like Proxy Supernode 106, that will accept its request for the target (i.e. Web Server 112) through Network 110, then choose Exit Node 108, forward the connection to it, and then Exit Node 108 will connect to Web Server 112 to retrieve targeted data.

Contained in Web Server 112, there are multiple operational elements that accept requests from User Device 102, return responses to it, and initiate server-push operations, like sending ping frames. Any communication to and from Web Server 112 passes through NIC 114 which is an element that connects to Network 110. All communication with the outside that goes through NIC 114 also passes through Firewall 116 which is a part of OS 118 that filters communication. In the current embodiments, NIC 114 and Firewall 116 are edge components of Web Server 112. However, in other embodiments, these components can be unified, so that Firewall 116 runs on NIC 114 (known as Firewall-embedded NIC). Firewall 116 can also be a dedicated hardware firewall that can be a separate physical component or a cloud service that will be a third party component not present within Web Server 112 (known as Firewall-as-a-Service). The particular arrangement of NIC 114 and Firewall 116 does not impact the overall functionality of the embodiments.

In current embodiments, OS 118 is a software component on Web Server 112 that enables other components to successfully run server hardware and execute commands. Examples of OS 118 products include but are not limited to Windows Server, Mac OS X Server, Red Hat Enterprise Linux (RHEL) and SUSE Linux Enterprise Server. In other embodiments, OS 118 can be implemented on a virtual machine (VM). VMs are computing instances created by a program running on another machine's hardware. The hardware creating the VM is called a host and the VM is called a guest. There can be many guest VMs on one host, and thus there can be multiple instances of OS 118 running on singular hardware as VMs. However, the functionality of the current embodiments is not changed by the usage of VMs.

Server Application 120, Logic Unit 112, and User Database 124 can be software applications running Web Server 112. Server Application 120, Logic Unit 112, and User Database 124 are interacting with OS 118 and with each other reciprocally.

Server Application 120 is responsible for receiving requests and responding to them. Server Application 120 can also formulate server push messages to be sent to User Device 102. In the current embodiments, Server Application 120 should be able to support HTTP/2 and/or QUIC protocols. Examples of such commercial applications include but are not limited to Internet Information Services, Apache Tomcat, Apache HTTP Server, nginx, LiteSpeed Web Server, Caddy, and others. Server Application 120 can communicate with outside components through OS 118. Server Application 120 can make queries to User Database 124 to retrieve data. It can also engage with Logic Unit 112 and make requests to it. However, in some embodiments, Server Application 120 can itself contain functionalities of Logic Unit 112 and/or User Database 124 without being considered a separate component. This division is made for clarity purposes to exhibit different functional components. If these components are contained in one hardware device or are external third party services, or are incorporated into a single software suite is not significant for the overall functionality of the embodiments.

In some embodiments, Logic Unit 112 can be a custom scripted component (for example, a custom script written in Python, R, Scala, JavaScript, SQL, *Julia* or other suitable programming language) or an available software that is able to execute arithmetical and statistical operations based on data available at the User Database 124. Logic Unit 112 can initiate operations on its own on a regular basis or it can receive instructions to execute operations from Server Application 120. The main goal of Logic Unit 112 is to calculate different RTTs, compensate for delays, and aggregate RTT data.

User Database 124 is a memory management unit that is able to store and return queries to Logic Unit 112 and Server Application 120 for data on the users of Web Server 112, their connection information and other attributes. In different embodiments, User Database 124 can contain multiple data models for storing and arranging data. In at least one embodiment, User Database 124 can contain users' IP address, IP type, consent to terms of services, dynamic parameters (time seen, session duration and timestamps, timestamps of idle connection, current total traffic, traffic per day or other period of time, ICMP ping RTT, HTTP/2 ping RTT, HTTP/2 ping RTT, and others), and aggregated dynamic parameters over any period of time (average ICMP ping RTT, average HTTP/2 ping RTT, average HTTP/2 ping RTT, average session duration and timestamps, average traffic, variations in which median and percentile groups are used instead of average values, and others) in any combination and with any weights associated with the parameters. User Database 124 is a software component, which can be located in a separate hardware component or unified with other components of Web Server 112. User Database 124 can be on a cloud (and available as a Database-as-a-Service). This does not change the overall functionality of the embodiments. Examples of database software include but are not limited to SolarWinds Database Performance Analyzer, Oracle RDBMS, IBM DB2, Altibase, Microsoft SQL Server, Redis, Memcache, MongoDB, Cassandra, ElasticSearch, and others.

Figure 2:
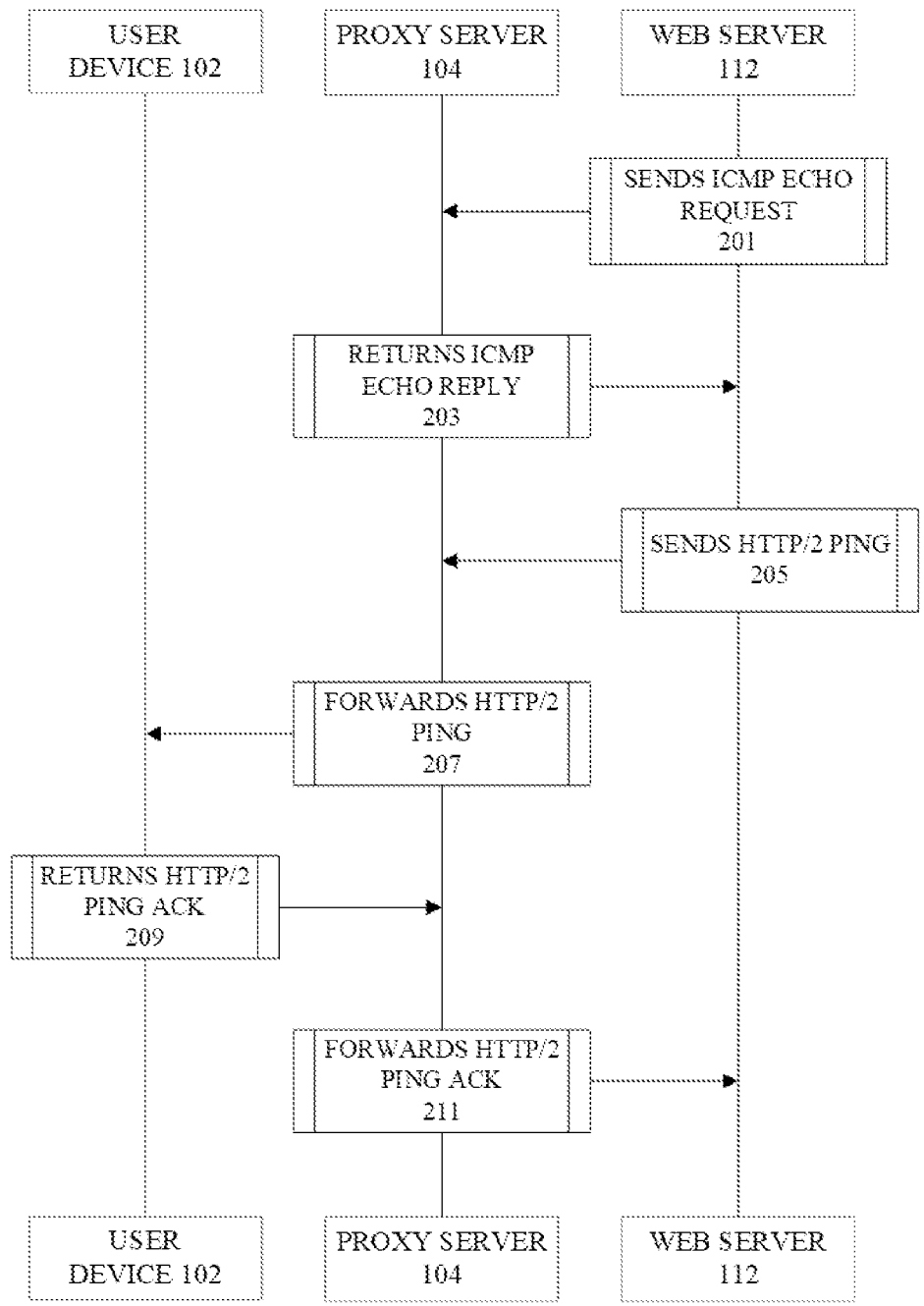
FIG. 2 shows an exemplary flow diagram of ICMP ping and HTTP/2 ping travel paths with a proxy server.

FIG. 2 represents an exemplary flow diagram of ICMP ping and HTTP/2 ping travel paths with a proxy server. In step 201, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. ICMP is a transport level protocol within TCP/IP which communicates information about network connectivity. However, other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Proxy Server 104 is used, Web Server 112 will detect the IP address of Proxy Server 104 and send an ICMP echo request to it.

In step 203, Proxy Server 104 receives ICMP echo request and responds to by returning an ICMP echo reply message. An ICMP echo reply message can be mandatory for all hosts, and should include the exact payload received in an ICMP echo request. The payload can include a timestamp indicating the time of transmission. This allows Web Server 112 to compute the round trip time.

In step 205, Web Server 112 sends an HTTP/2 ping frame to User Device 102. It is assumed that Web Server 112 and User Device 102 already have an HTTP/2 connection established and stream ID_0 is open for Web Server 112 to use since HTTP/2 ping frames can only be sent through stream ID_0. Since all HTTP/2 server-to-user communication happens with encryption, also known as h2, the traffic between Web Server 112 and User Device 102 will be encrypted until it reaches its final destination. This means that traffic is encrypted at Web Server 112 with the public key of User Device 102 and can only be decrypted at User Device 102 with its private key. Likewise, traffic is encrypted at User Device 102 with the public key of Web Server 112 and can only be decrypted at Web Server 112 with its private key. Thus, in step 205, Web Server 112 formulates an h2 ping frame and sends it to User Device 102.

Because h2 traffic is encrypted, ping frames are not distinguishable from other frames by an intermediary proxy, in this case, by Proxy Server 104 which cannot decrypt the frames and blindly passes them on to its user, i.e. User Device 102. Thus, in step 207, Proxy Server 104 simply forwards the HTTP/2 ping to User Device 102.

In step 209, User Device 102 receives HTTP/2 ping and, according to the protocol, must return an HTTP/2 ping with an ACK flag to Web Server 112. Receivers of a ping frame that does not include an ACK flag must send a ping frame with the ACK flag set in response, with an identical payload. Ping responses should be given higher priority than any other frame, since a ping frame is used to measure a round trip from the sender. User Device 102 sends the response through Proxy Server 104, i.e. through an already established HTTP connection.

In step 211, Proxy Server 104, which cannot decrypt the traffic, blindly passes an HTTP/2 ping frame with an ACK flag to Web Server 112. Proxy Server 104 simply forwards the response to Web Server 112 without being able to modify it.

The processes of ICMP ping and HTTP/2 ping are comparable to each other in terms of time it takes them to complete. Moreover, it can be compared in terms of steps or hops in the network that it takes them to reach the destination and get back. In one embodiment, where Proxy Server 104 is used, it takes two extra hops to complete an HTTP/2 ping. The extra hops take time to complete, thus the RTT of the HTTP/2 ping is predictably longer than that of ICMP ping. In some embodiments, to achieve a calculation of the RTTs and their comparison Web Server 112 can choose to begin the ICMP ping (step 201) and HTTP/2 ping (step 205) at the same time. In other embodiments, it can wait for one type of ping to return before sending another type of ping. The order of the pings does not change the overall functionality of the embodiments.

Figure 3:
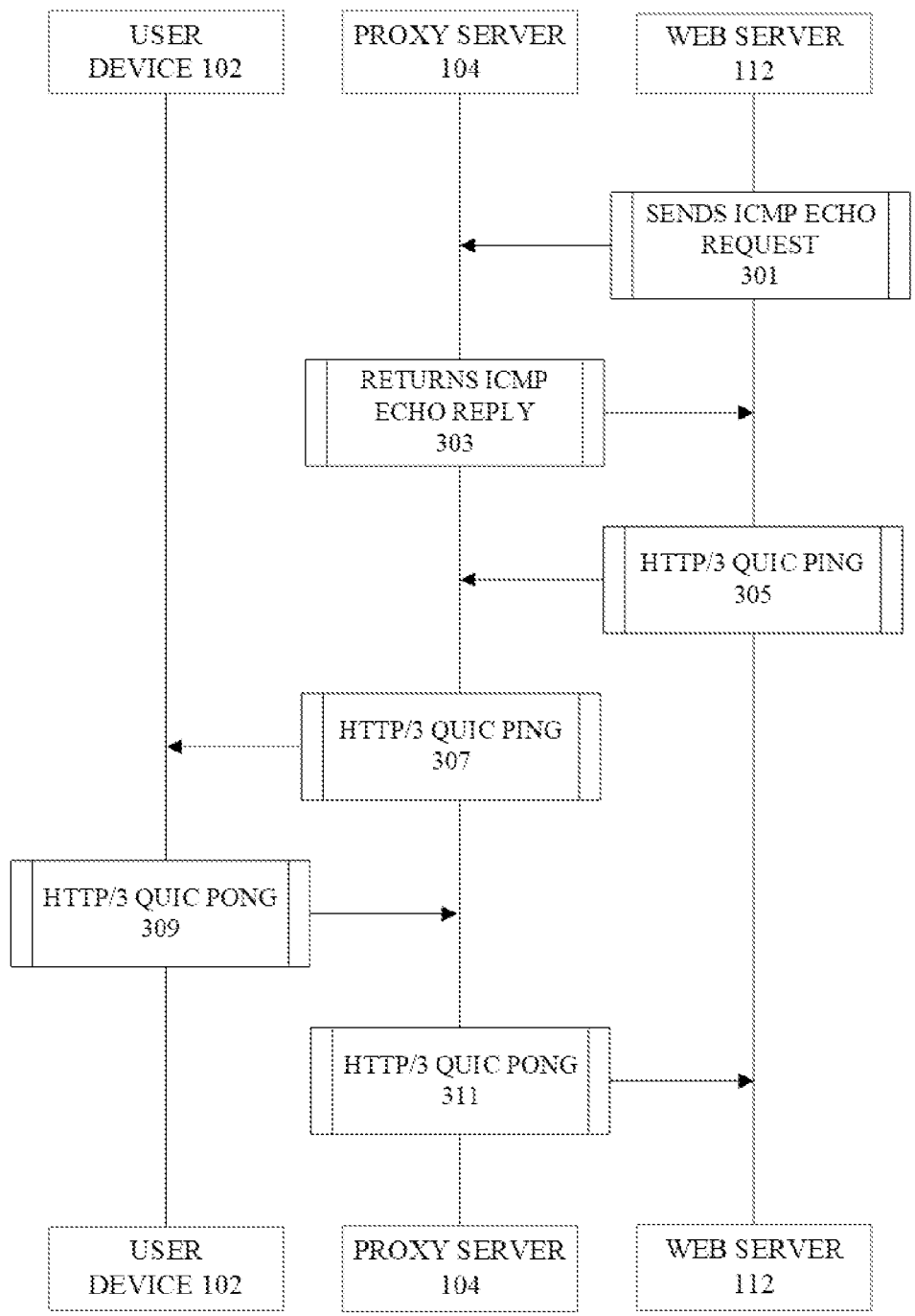
FIG. 3 shows an exemplary flow diagram of ICMP ping and HTTP/3 QUIC ping travel paths with a proxy server.

FIG. 3 represents an exemplary flow diagram of ICMP ping and HTTP/3 QUIC ping travel paths with a proxy server. In step 301, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. Other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Proxy Server 104 is used, Web Server 112 will detect the IP address of Proxy Server 104 and send an ICMP echo request to it.

In step 303, Proxy Server 104 receives ICMP echo request and responds to by returning an ICMP echo reply message. An ICMP echo reply message is mandatory for all hosts, and must include the exact payload received in ICMP echo request. The payload can include a timestamp indicating the time of transmission. This allows Web Server 112 to compute the RTT.

In step 305, Web Server 112 sends an HTTP/3, otherwise called HTTP/3 QUIC ping frame to User Device 102. Differently from an HTTP/2 ping frame, the HTTP/3 QUIC ping frame contains a variable-length payload. But if the data field is not empty, User Device 102 must generate a pong frame containing the same data. A pong frame is a reply to a ping frame, similar to a HTTP/2 ping frame with an ACK flag. Thus, using QUIC ping, Web Server 118 can also test a RTT to User Device 102 which contains the browser or other application accessing Web Server 118.

Because QUIC traffic is encrypted by default, HTTP/3 QUIC ping frames are not distinguishable from other frames by an intermediary proxy, in this case, by Proxy Server 104 which cannot decrypt the frames and blindly passes them on to its user, i.e. User Device 102. Thus, in step 307, Proxy Server 104 simply forwards the HTTP/3 QUIC ping to User Device 102.

In step 309, User Device 102 receives HTTP/3 QUIC ping and, according to the protocol, must return a HTTP/3 QUIC pong message to Web Server 112.

In step 311, Proxy Server 104, which cannot decrypt the traffic, blindly passes a HTTP/3 QUIC pong message to Web Server 112. Proxy Server 104 simply forwards the response to Web Server 112 without being able to modify it.

The processes of ICMP ping and HTTP/3 QUIC ping are comparable to each other in terms of time it takes them to complete. Moreover, it can be compared in terms of steps or hops in the network that it takes them to reach the destination and get back. In one embodiment, where Proxy Server 104 is used, it takes two extra hops to complete an HTTP/3 ping. The extra hops take time to complete, thus the RTT of the HTTP/3 QUIC ping is predictably longer than that of ICMP ping. In some embodiments, to achieve a calculation of the RTTs and their comparison Web Server 112 can choose to begin the ICMP ping (step 301) and HTTP/3 QUIC ping (step 305) at the same time. In other embodiments, it can wait for one type of ping to return before sending another type of ping. The order of the pings does not change the overall functionality of the embodiments.

Figure 4:
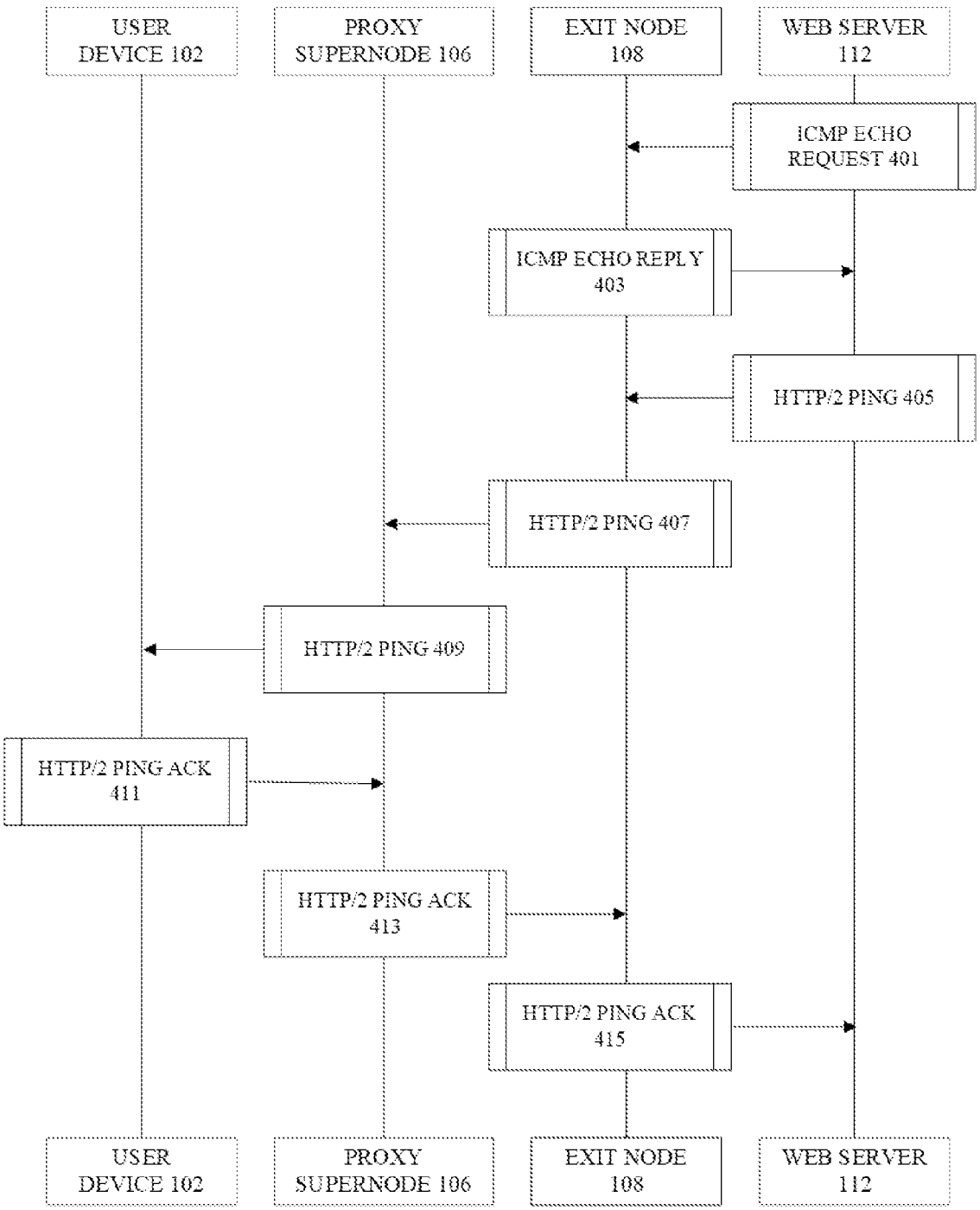
FIG. 4 shows an exemplary flow diagram of ICMP ping and HTTP/2 ping travel paths with a proxy supernode and exit node.

FIG. 4 represents an exemplary flow diagram of ICMP ping and HTTP/2 ping travel paths with a proxy supernode and exit node. In step 401, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. However, other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Exit Node 108 is used, Web Server 112 will detect the IP address of Exit Node 108 and send an ICMP echo request to it.

In step 403, Exit Node 108 receives ICMP echo request and responds to by returning an ICMP echo reply message. An ICMP echo reply message is mandatory for all hosts, and must include the exact payload received in ICMP echo request. The payload can include a timestamp indicating the time of transmission. This allows Web Server 112 to compute the round trip time.

In step 405, Web Server 112 sends an HTTP/2 ping frame to User Device 102. It is assumed that Web Server 112 and User Device 102 already have an HTTP/2 connection established and stream ID_0 is open for Web Server 112 to use since HTTP/2 ping frames can only be sent through stream ID_0. Since all HTTP/2 server-to-user communication happens with encryption, also known as h2, the traffic between Web Server 112 and User Device 102 will be encrypted until it reaches its final destination. This means that traffic is encrypted at Web Server 112 with the public key of User Device 102 and can only be decrypted at User Device 102 with its private key. Likewise, traffic is encrypted at User Device 102 with the public key of Web Server 112 and can only be decrypted at Web Server 112 with its private key. Thus, in step 405, Web Server 112 formulates an h2 ping frame and sends it to User Device 102.

Because h2 traffic is encrypted, ping frames are not distinguishable from other frames by an intermediary proxy, in this case, by Exit Node 108 and Proxy Supernode 106 that cannot decrypt the frames and blindly pass them on to their user, i.e. User Device 102. Thus, in step 407, Proxy Server 104 simply forwards the HTTP/2 ping to Proxy Supernode 106.

Proxy Supernode 106 is an exit node service provider. Usually, a User Device 102 connects to Proxy Supernode 106 to make requests and Proxy Supernode 106 selects the most fitting exit node to relay the requests. Thus, User Device 102, Proxy Supernode 106, and a selected Exit Node 108 can form a proxy chain to a Web Server 112. H2 traffic is being transferred from a User Device 102 to Web Server 112 transparently through the proxy chain since it is encrypted and none of the mediating parties can decrypt it. Therefore, in step 409 Proxy Supernode 106 transfers the HTTP/2 ping message to a User Device 102.

In step 411, User Device 102 receives HTTP/2 ping and, according to the protocol, must return an HTTP/2 ping with an ACK flag to Web Server 112. Receivers of a ping frame that does not include an ACK flag must send a ping frame with the ACK flag set in response, with an identical payload. Ping responses should be given higher priority than any other frame, since a ping frame is used to measure a round trip from the sender. User Device 102 sends the response through the proxy chain, beginning with Proxy Supernode 106.

In step 413, Proxy Supernode 106, which cannot decrypt the traffic, blindly passes an HTTP/2 ping frame with an ACK flag to Exit Node 108.

Similarly, in step 415, Exit Node 108 passes an HTTP/2 ping frame with an ACK flag to Web Server 112.

The processes of ICMP ping and HTTP/2 ping are comparable to each other in terms of time it takes them to complete. Moreover, it can be compared in terms of steps or hops in the network that it takes them to reach the destination and get back. In one embodiment, where both a Proxy Supernode 106 and an Exit Node 108 are used, it takes four extra hops to complete an HTTP/2 ping. The extra hops take time to complete, thus the RTT of the HTTP/2 ping is predictably longer than that of ICMP ping. In some embodiments, to achieve a calculation of the RTTs and their comparison Web Server 112 can choose to begin the ICMP ping (step 401) and HTTP/2 ping (step 405) at the same time. In other embodiments, it can wait for one type of ping to return before sending another type of ping. The order of the pings does not change the overall functionality of the embodiments.

Figure 5:
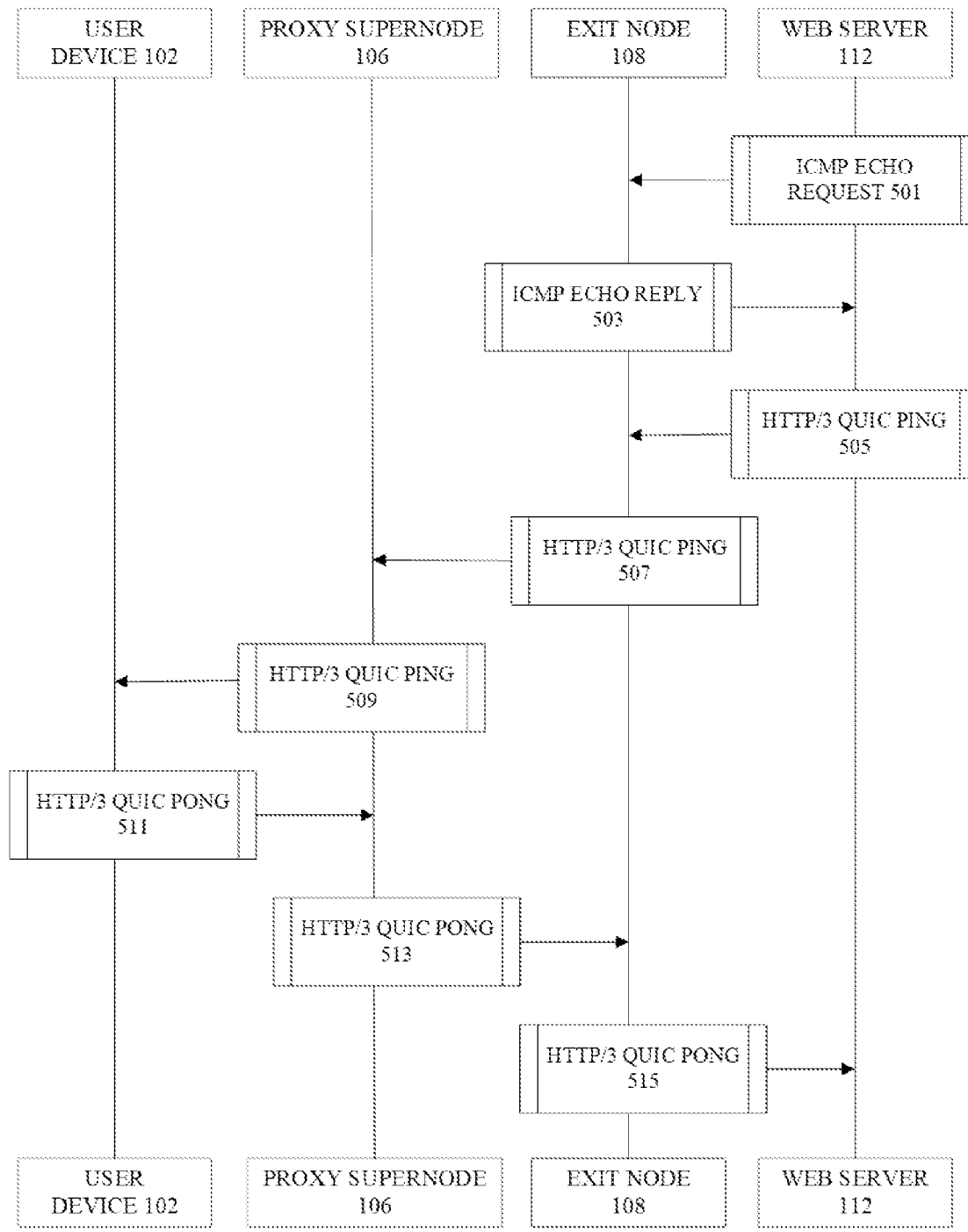
FIG. 5 shows an exemplary flow diagram of ICMP ping and HTTP/3 QUIC ping travel paths with a proxy supernode and exit node.

FIG. 5 represents an exemplary flow diagram of ICMP ping and HTTP/3 QUIC ping travel paths with a proxy supernode and exit node. In step 501, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. However, other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Exit Node 108 is used, Web Server 112 will detect the IP address of Exit Node 108 and send an ICMP echo request to it.

In step 503, Exit Node 108 receives ICMP echo request and responds to by returning an ICMP echo reply message. An ICMP echo reply message is mandatory for all hosts, and must include the exact payload received in ICMP echo request. The payload can include a timestamp indicating the time of transmission. This allows Web Server 112 to compute the round trip time.

In step 505, Web Server 112 sends an HTTP/3, otherwise called HTTP/3 QUIC ping frame to User Device 102. Differently from an HTTP/2 ping frame, the HTTP/3 QUIC ping frame contains a variable-length payload. Empty ping frames are only used to keep a connection alive. But if the data field is not empty, User Device 102 must generate a pong frame containing the same data. A pong frame is a reply to a ping frame, similar to a HTTP/2 ping frame with an ACK flag. Thus, using QUIC ping, Web Server 118 can also test a RTT to User Device 102 which contains the browser or other application accessing Web Server 118.

Because QUIC traffic is encrypted by default, HTTP/3 QUIC ping frames are not distinguishable from other frames by any intermediary proxy. Thus, in step 507, Exit Node 108 simply forwards the HTTP/3 QUIC ping to Proxy Supernode 106.

Proxy Supernode 106 is an exit node service provider. Usually, a User Device 102 connects to Proxy Supernode 106 to make requests and Proxy Supernode 106 selects the most fitting exit node to relay the requests. Thus, User Device 102, Proxy Supernode 106, and a selected Exit Node 108 can form a proxy chain to a Web Server 112. QUIC traffic is being transferred from a User Device 102 to Web Server 112 transparently through the proxy chain since it is encrypted and none of the mediating parties can decrypt it. Therefore, in step 509 Proxy Supernode 106 transfers the HTTP/3 QUIC ping message to a User Device 102.

In step 511, User Device 102 receives HTTP/3 QUIC ping and, according to the protocol, must return a HTTP/3 QUIC pong message to Web Server 112 through the proxy chain.

In step 513, Proxy Supernode 106, which cannot decrypt the traffic, blindly passes an HTTP/3 QUIC pong message to Exit Node 108.

Similarly, in step 515, Exit Node 108 passes an HTTP/3 QUIC pong message to Web Server 112.

Figure 6A:
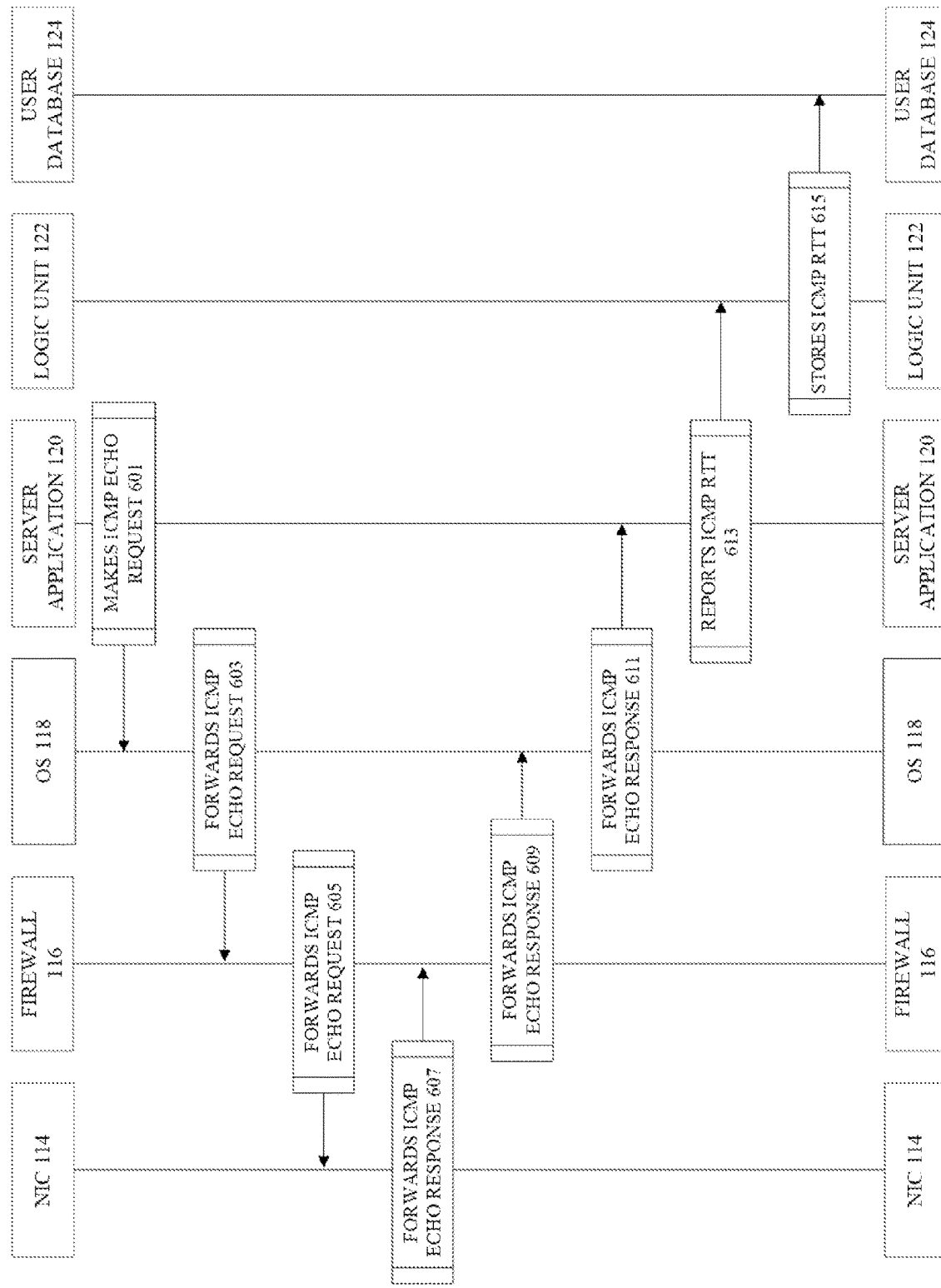
FIG. 6A shows an exemplary flow diagram of ICMP ping and HTTP/2 ping facilitation within a web server.

FIG. 6A represents an exemplary flow diagram of ICMP ping and HTTP/2 ping facilitation within a web server. The processes described herein can be synchronous with processes described in FIGS. 2, 3, 4, and 5. This means that the internal functionality of Web Server 112 can happen at the same time that various ping messages are traveling through Network 110 and being processed in any external elements. It is assumed that there is prior communication between Web Server 112 and User Device 102 such that an IP address of a last-mile proxy is known and there is an HTTP/2 connection active between Web Server 112 and User Device 102.

In step 601, Server Application 120 initiates an ICMP ping process by formulating and sending an ICMP echo request. In some embodiments, ICMP ping can be formulated in a separate or dedicated ICMP application but in the current embodiment the ICMP application functionalities are included in the Server Application 120, so it can formulate and send ICMP echo requests on its own. In some embodiments, once the ICMP echo request is made, a timestamp is marked into the ping payload. This timestamp will mark the initial point in the RTT calculation. The IP address of Exit Node 108, Proxy Server 104, or User Device 102 is included in the header of the ICMP echo request. Server Application 120 makes an ICMP echo request and transfers it to OS 118.

In step 603, OS 118 receives the ICMP echo request from Server Application 120 and forwards it to Firewall 116. All incoming and outgoing traffic must pass through Firewall 116 to be properly filtered. This includes ICMP packets.

In step 605, Firewall 116 receives ICMP echo request from OS 118, checks the header for the destination IP address (Exit Node 108, Proxy Server 104, or User Device 102) and filters it according to its preconfigured filters. In some embodiments, Firewall 116 can be configured to allow all outgoing ICMP messages or all traffic generally or it can be configured to block incoming and outgoing traffic to and from a particular IP address. However, if an ICMP echo request is allowed by Firewall 116, it is relayed to NIC 114 to be transferred over Network 110.

In step 607, NIC 114 receives an ICMP echo response from a destination IP address. In some cases, a response can time out and never arrive. This happens when an ICMP echo request passes its TTL and is no longer forwarded in Network 110. It is possible to Exit Node 108, Proxy Server 104, or User Device 102 to block ICMP communication. This is sometimes done to prevent distributed denial-of-service (DDoS) attacks. If an ICMP echo response does not arrive, steps 607, 609, 611, 613, and 615 can be skipped.

However, in the present embodiment we assume that an ICMP echo response does arrive from the destination IP address. In that case, it will be first received by NIC 114 that communicates directly with Network 110. Once NIC 114 receives an ICMP echo response it forwards it to Firewall 116.

In step 609, Firewall 116 receives an ICMP echo response from NIC 114. Usually, if the ICMP echo request was not filtered by Firewall 116, an ICMP echo response will also be allowed. However, Firewall 116 filters all incoming and outgoing traffic, so it automatically checks whether the source IP address is not blacklisted. Then it forwards the ICMP echo response to OS 118.

In step 611, OS 118 receives ICMP echo response from Firewall 116 and forwards it to Server Application 120.

In step 613, Server Application 120 receives ICMP echo response from OS 118. At this point it marks the ICMP echo response with a received timestamp that marks the exact time that the ICMP echo response was received. The difference between the ICMP echo request timestamp ICMP echo response timestamp will mark the RTT of an ICMP ping. Additionally, Server Application 120 can perform the arithmetical operation to subtract the ICMP echo request timestamp from ICMP echo response timestamp to achieve an RTT. However, in some embodiments this arithmetical procedure can be performed elsewhere, for example at Logic Unit 122 or User Database 124. However, in this embodiment, RTT is calculated at Server Application 120 and then reported to Logic Unit 122. Server Application 120 can also report full timestamps along with RTT.

In step 615, Logic Unit 122 gathers all data received from Server Application 120, for example, RTTs and timestamps, and records them to User Database 124. In some embodiments, Server Application 120 can directly store data like RTTs and timestamps in User Database 124 without communicating with Logic Unit 122. In that case, step 615 would be skipped and Server Application 120 would directly store data in User Database 124. However, this does not change the overall functionality of the embodiments.

Figure 6B:
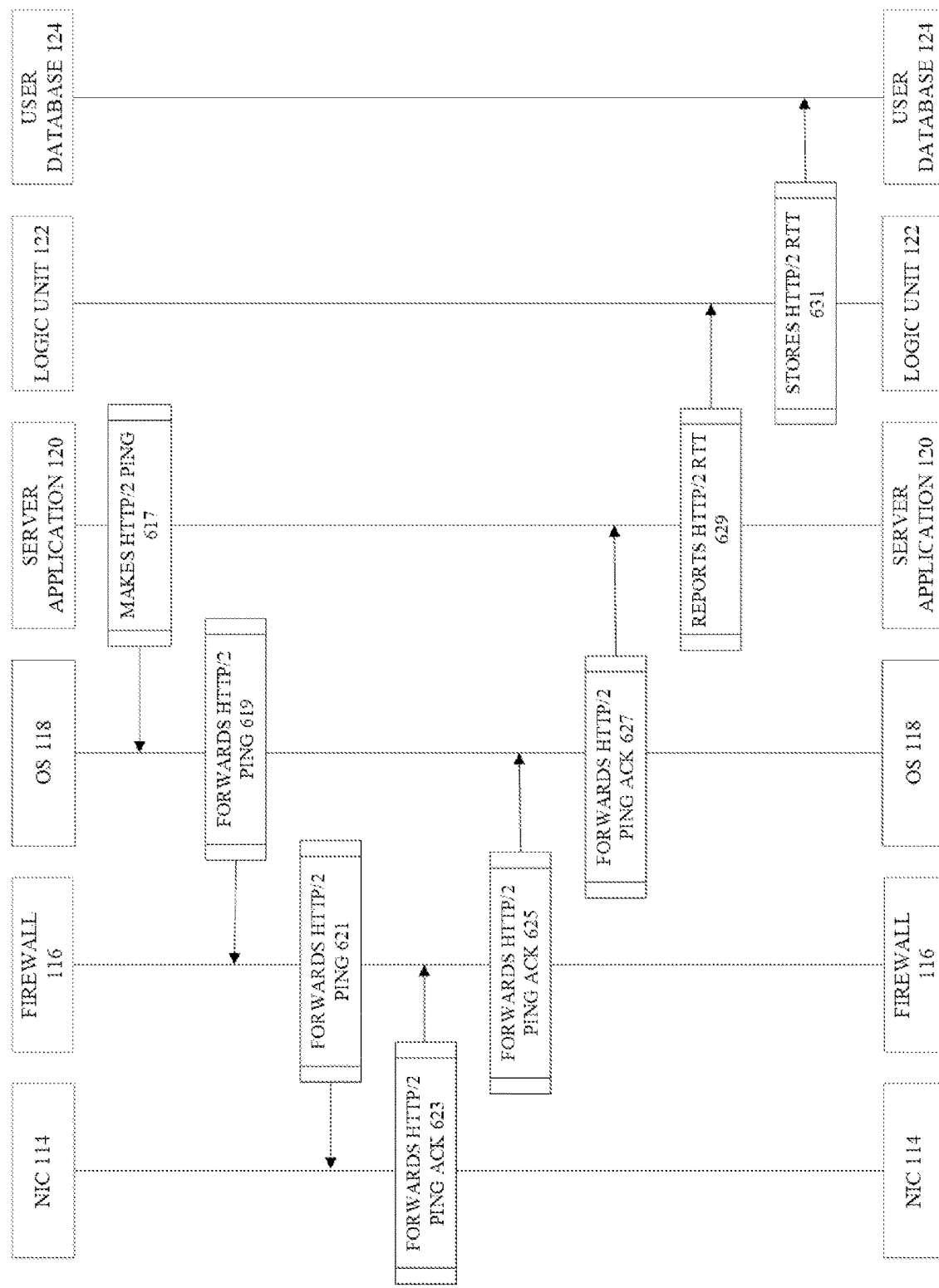
FIG. 6B shows the continuation of the exemplary flow diagram of ICMP ping and HTTP/2 ping facilitation within a web server.

FIG. 6B shows the continuation of the exemplary flow diagram of ICMP ping and HTTP/2 ping facilitation within a web server. In step 617, Server Application 120 initiates an HTTP/2 ping process by formulating and sending an HTTP/2 ping. HTTP/2 pings are made over an already established HTTP/2 connection and over stream id_0 which is a priority metadata stream. Server Application 120 formulates a ping message and places it into an HTTP/2 framing layer where it is marked as a PING frame (0x6). It is then transmitted via HTTP/2 stream ID 0.

In some embodiments, once the HTTP/2 ping is made, a timestamp is marked into the ping payload. This timestamp will mark the initial point in the RTT calculation. The HTTP/2 connection extends from Web Server 112 to User Device 102, so the destination of the ping is User Device 102. Any intermediary proxies will not detect a ping frame due to encryption. Inside Web Server 112, Server Application 120 first makes an HTTP/2 ping and transfers it to OS 118.

In step 619, OS 118 receives the HTTP/2 ping from Server Application 120 and forwards it to Firewall 116. All incoming and outgoing traffic must pass through Firewall 116 to be properly filtered. This includes HTTP/2 traffic.

In step 621, Firewall 116 receives HTTP/2 ping from OS 118 and, if an HTTP/2 ping is allowed by Firewall 116, it is relayed to NIC 114 to be transferred over Network 110.

In step 623, NIC 114 receives an HTTP/2 ping with ACK flag from a destination IP address. In some cases, a response can time out and never arrive. This happens when an HTTP/2 times out or a host disconnects. If an HTTP/2 ping with ACK flag does not arrive, steps 623, 625, 627, 629, and 631 can be skipped.

However, in the present embodiment we assume that an HTTP/2 ping with ACK flag does arrive from the destination. In that case, it will be first received by NIC 114 that communicates directly with Network 110. Once NIC 114 receives an HTTP/2 ping with ACK flag it forwards it to Firewall 116.

In step 625, Firewall 116 receives an HTTP/2 ping with ACK flag from NIC 114. Firewall 116 filters all incoming and outgoing traffic, so it automatically checks whether the source IP address is not blacklisted. Then it forwards the HTTP/2 ping with ACK flag to OS 118.

In step 627, OS 118 receives HTTP/2 ping with ACK flag from Firewall 116 and forwards it to Server Application 120.

In step 629, Server Application 120 receives HTTP/2 ping with ACK flag from OS 118. At this point it marks the HTTP/2 ping with ACK flag with a received timestamp that marks the exact time that the HTTP/2 ping with ACK flag was received. The difference between the HTTP/2 ping timestamp HTTP/2 ping with ACK flag timestamp will mark the RTT of an HTTP/2 ping. Additionally, Server Application 120 can perform the arithmetical operation to subtract the HTTP/2 ping timestamp from HTTP/2 ping with ACK flag timestamp to achieve an RTT. However, in some embodiments this arithmetical procedure can be performed elsewhere, for example at Logic Unit 122 or User Database 124. However, in this embodiment, RTT is calculated at Server Application 120 and then reported to Logic Unit 122. Server Application 120 can also report full timestamps along with RTT.

In step 631, Logic Unit 122 gathers all data received from Server Application 120, for example, RTTs and timestamps, and records them to User Database 124. In some embodiments, Server Application 120 can directly store data like RTTs and timestamps in User Database 124 without communicating with Logic Unit 122. In that case, step 631 would be skipped and Server Application 120 would directly store data in User Database 124. However, this does not change the overall functionality of the embodiments.

Figure 7A:
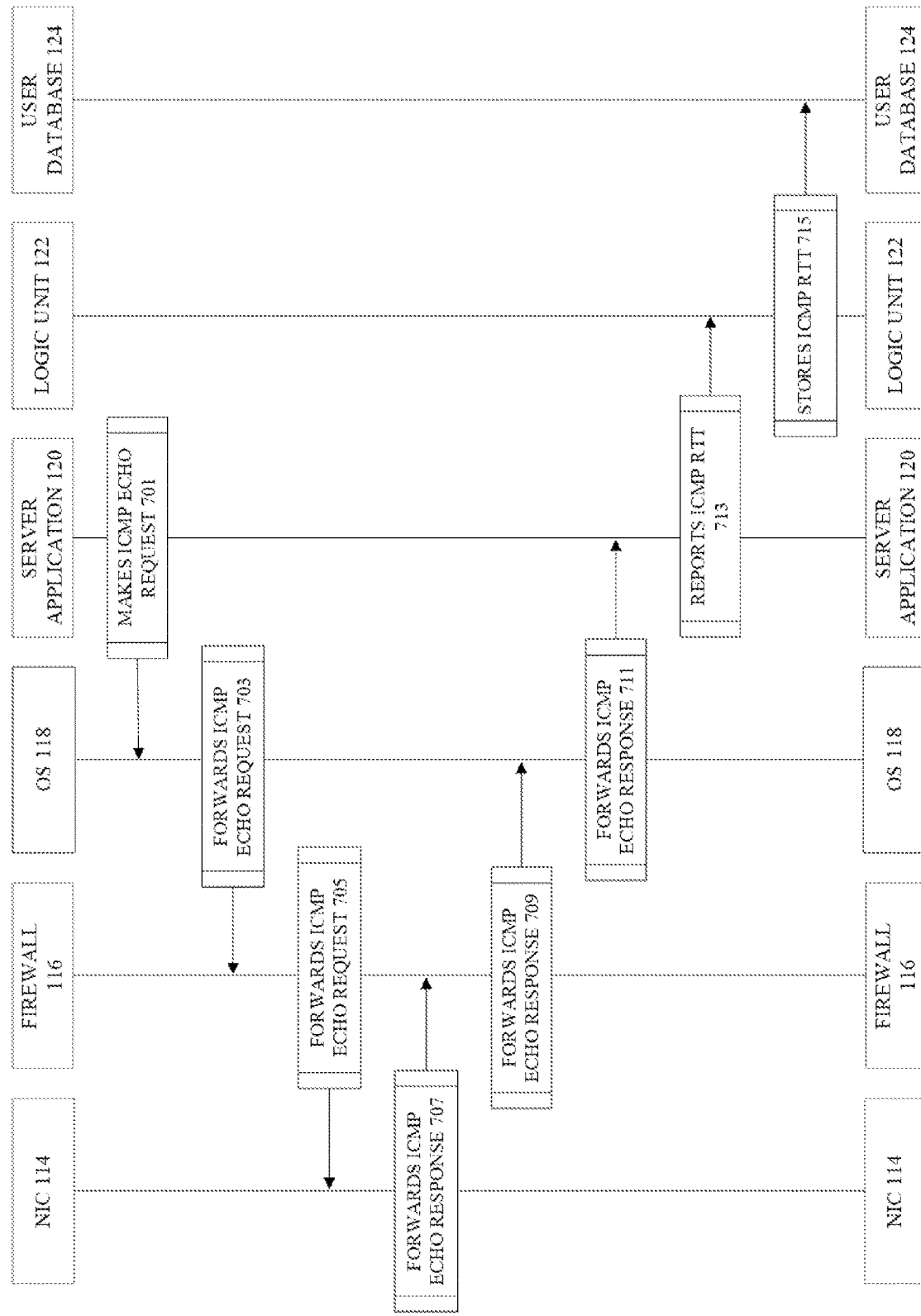
FIG. 7A shows an exemplary flow diagram of ICMP ping and HTTP/3 QUIC ping facilitation within a web server.

FIG. 7A represents an exemplary flow diagram of ICMP ping and HTTP/3 QUIC ping facilitation within a web server. The processes described herein can be synchronous with processes described in FIGS. 2, 3, 4, and 5. This means that the internal functionality of Web Server 112 can happen at the same time that various ping messages are traveling through Network 110 and being processed in any external elements. It is assumed that there is prior communication between Web Server 112 and User Device 102 such that an IP address of a last-mile proxy is known and there is an HTTP/3 QUIC connection active between Web Server 112 and User Device 102.

In step 701, Server Application 120 initiates an ICMP ping process by formulating and sending an ICMP echo request. In some embodiments, ICMP ping can be formulated in a separate or dedicated ICMP application but in the current embodiment the ICMP application functionalities are included in the Server Application 120, so it can formulate and send ICMP echo requests on its own. In some embodiments, once the ICMP echo request is made, a timestamp is marked into the ping payload. This timestamp will mark the initial point in the RTT calculation. The IP address of Exit Node 108, Proxy Server 104, or User Device 102 is included in the header of the ICMP echo request. Server Application 120 makes an ICMP echo request and transfers it to OS 118.

In step 703, OS 118 receives the ICMP echo request from Server Application 120 and forwards it to Firewall 116. All incoming and outgoing traffic must pass through Firewall 116 to be properly filtered. This includes ICMP packets.

In step 705, Firewall 116 receives ICMP echo request from OS 118, checks the header for the destination IP address (Exit Node 108, Proxy Server 104, or User Device 102) and filters it according to its preconfigured filters. In some embodiments, Firewall 116 can be configured to allow all outgoing ICMP messages or all traffic generally or it can be configured to block incoming and outgoing traffic to and from a particular IP address. However, if an ICMP echo request is allowed by Firewall 116, it is relayed to NIC 114 to be transferred over Network 110.

In step 707, NIC 114 receives an ICMP echo response from a destination IP address. In some cases, a response can time out and never arrive. This happens when an ICMP echo request passes its TTL and is no longer forwarded in Network 110. It is possible to Exit Node 108, Proxy Server 104, or User Device 102 to block ICMP communication. This is sometimes done to prevent distributed denial-of-service (DDoS) attacks. If an ICMP echo response does not arrive, steps 707, 709, 711, 713, and 715 can be skipped.

However, in the present embodiment we assume that an ICMP echo response does arrive from the destination IP address. In that case, it will be first received by NIC 114 that communicates directly with Network 110. Once NICe 114 receives an ICMP echo response it forwards it to Firewall 116.

In step 709, Firewall 116 receives an ICMP echo response from NIC 114. Usually, if the ICMP echo request was not filtered by Firewall 116, an ICMP echo response will also be allowed. However, Firewall 116 filters all incoming and outgoing traffic, so it automatically checks whether the source IP address is not blacklisted. Then it forwards the ICMP echo response to OS 118.

In step 711, OS 118 receives ICMP echo response from Firewall 116 and forwards it to Server Application 120.

In step 713, Server Application 120 receives ICMP echo response from OS 118. At this point it marks the ICMP echo response with a received timestamp that marks the exact time that the ICMP echo response was received. The difference between the ICMP echo request timestamp ICMP echo response timestamp will mark the RTT of an ICMP ping. Additionally, Server Application 120 can perform the arithmetical operation to subtract the ICMP echo request timestamp from ICMP echo response timestamp to achieve an RTT. However, in some embodiments this arithmetical procedure can be performed elsewhere, for example at Logic Unit 122 or User Database 124. However, in this embodiment, RTT is calculated at Server Application 120 and then reported to Logic Unit 122. Server Application 120 can also report full timestamps along with RTT.

In step 715, Logic Unit 122 gathers all data received from Server Application 120, for example, RTTs and timestamps, and records them to User Database 124. In some embodiments, Server Application 120 can directly store data like RTTs and timestamps in User Database 124 without communicating with Logic Unit 122. In that case, step 715 would be skipped and Server Application 120 would directly store data in User Database 124. However, this does not change the overall functionality of the embodiments.

Figure 7B:
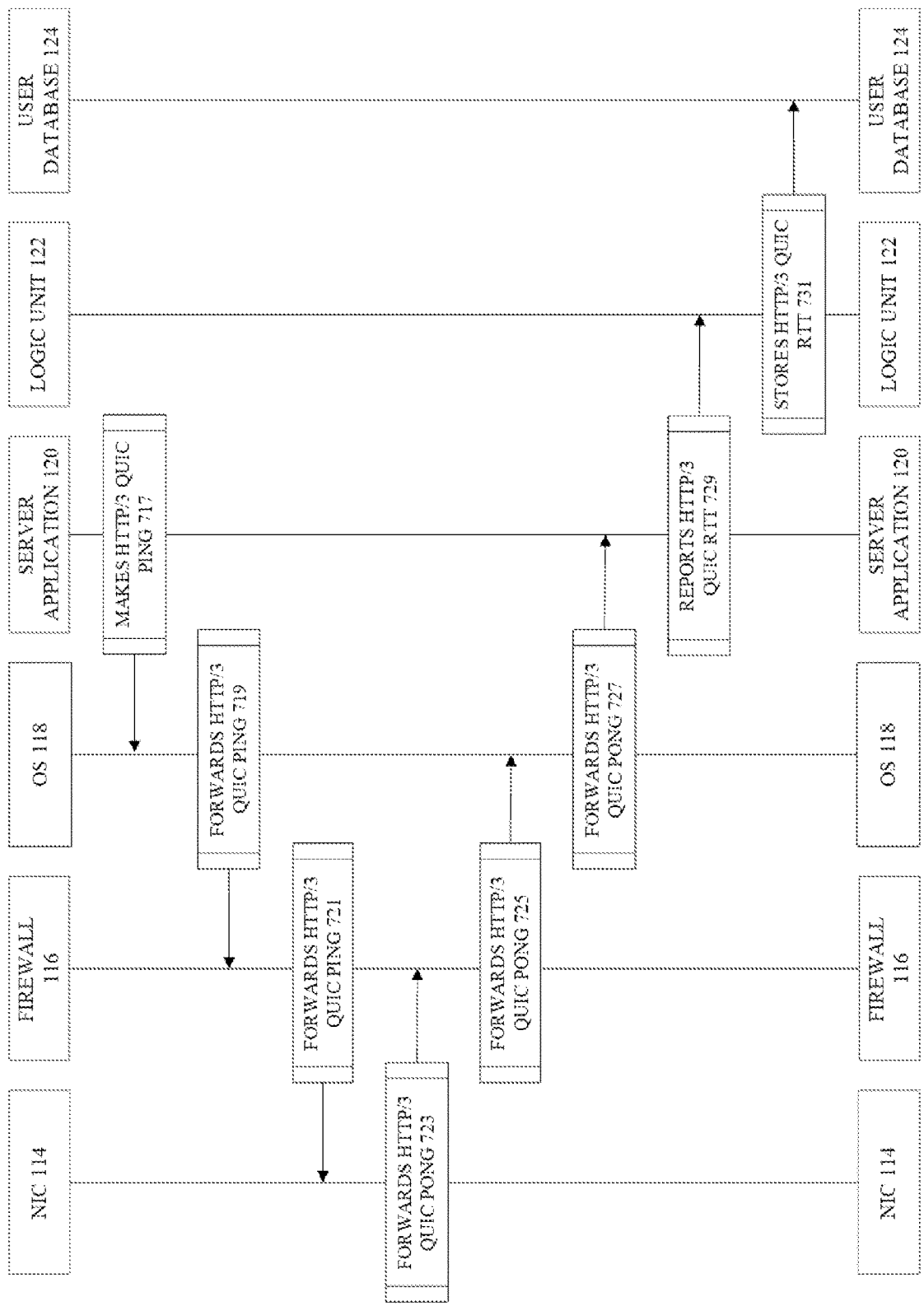
FIG. 7B shows the continuation of the exemplary flow diagram of ICMP ping and HTTP/3 QUIC ping facilitation within a web server.

FIG. 7B represents the continuation of the exemplary flow diagram of ICMP ping and HTTP/3 QUIC ping facilitation within a web server. In step 717, Server Application 120 initiates an HTTP/3 QUIC ping process by formulating and sending an HTTP/3 QUIC ping frame. HTTP/3 QUIC pings are made over an already established HTTP/3 QUIC connection. Server Application 120 formulates a ping message and marks it as a PING frame (type=0x07). It is then transmitted via HTTP/3 QUIC.

In some embodiments, once the HTTP/3 QUIC ping is made, a timestamp is marked into the ping payload. This timestamp will mark the initial point in the RTT calculation. The HTTP/3 QUIC connection extends from Web Server 112 to User Device 102, so the destination of the ping is User Device 102. Any intermediary proxies will not detect a ping frame due to encryption. Inside Web Server 112, Server Application 120 first makes an HTTP/3 QUIC ping and transfers it to OS 118.

In step 719, OS 118 receives the HTTP/3 QUIC ping from Server Application 120 and forwards it to Firewall 116. All incoming and outgoing traffic must pass through Firewall 116 to be properly filtered. This includes HTTP/3 QUIC traffic.

In step 721, Firewall 116 receives HTTP/3 QUIC ping from OS 118 and, if an HTTP/3 QUIC ping is allowed by Firewall 116, it is relayed to NIC 114 to be transferred over Network 110.

In step 723, NIC 114 receives an HTTP/3 QUIC pong from a destination IP address. In some cases, a response can time out and never arrive. This happens when an HTTP/3 QUIC times out or a host disconnects. If an HTTP/3 QUIC pong does not arrive, steps 723, 725, 727, 729, and 731 can be skipped.

However, in the present embodiment we assume that an HTTP/3 QUIC pong does arrive from the destination. In that case, it will be first received by NIC 114 that communicates directly with Network 110. Once NIC 114 receives an HTTP/3 QUIC pong it forwards it to Firewall 116.

In step 725, Firewall 116 receives an HTTP/3 QUIC pong from NIC 114. Firewall 116 filters all incoming and outgoing traffic, so it automatically checks whether the source IP address is not blacklisted. Then it forwards the HTTP/3 QUIC pong to OS 118.

In step 727, OS 118 receives HTTP/3 QUIC pong from Firewall 116 and forwards it to Server Application 120.

In step 729, Server Application 120 receives HTTP/3 QUIC pong from OS 118. At this point it marks the HTTP/3 QUIC pong with a received timestamp that marks the exact time that the HTTP/3 QUIC pong was received. The difference between the HTTP/3 QUIC ping timestamp HTTP/3 QUIC pong timestamp will mark the RTT of an HTTP/3 QUIC ping. Additionally, Server Application 120 can perform the arithmetical operation to subtract the HTTP/3 QUIC ping timestamp from HTTP/3 QUIC pong timestamp to achieve an RTT. However, in some embodiments this arithmetical procedure can be performed elsewhere, for example at Logic Unit 122 or User Database 124. However, in this embodiment, RTT is calculated at Server Application 120 and then reported to Logic Unit 122. Server Application 120 can also report full timestamps along with RTT.

In step 731, Logic Unit 122 gathers all data received from Server Application 120, for example, RTTs and timestamps, and records them to User Database 124. In some embodiments, Server Application 120 can directly store data like RTTs and timestamps in User Database 124 without communicating with Logic Unit 122. In that case, step 731 would be skipped and Server Application 120 would directly store data in User Database 124. However, this does not change the overall functionality of the embodiments.

Figure 8:
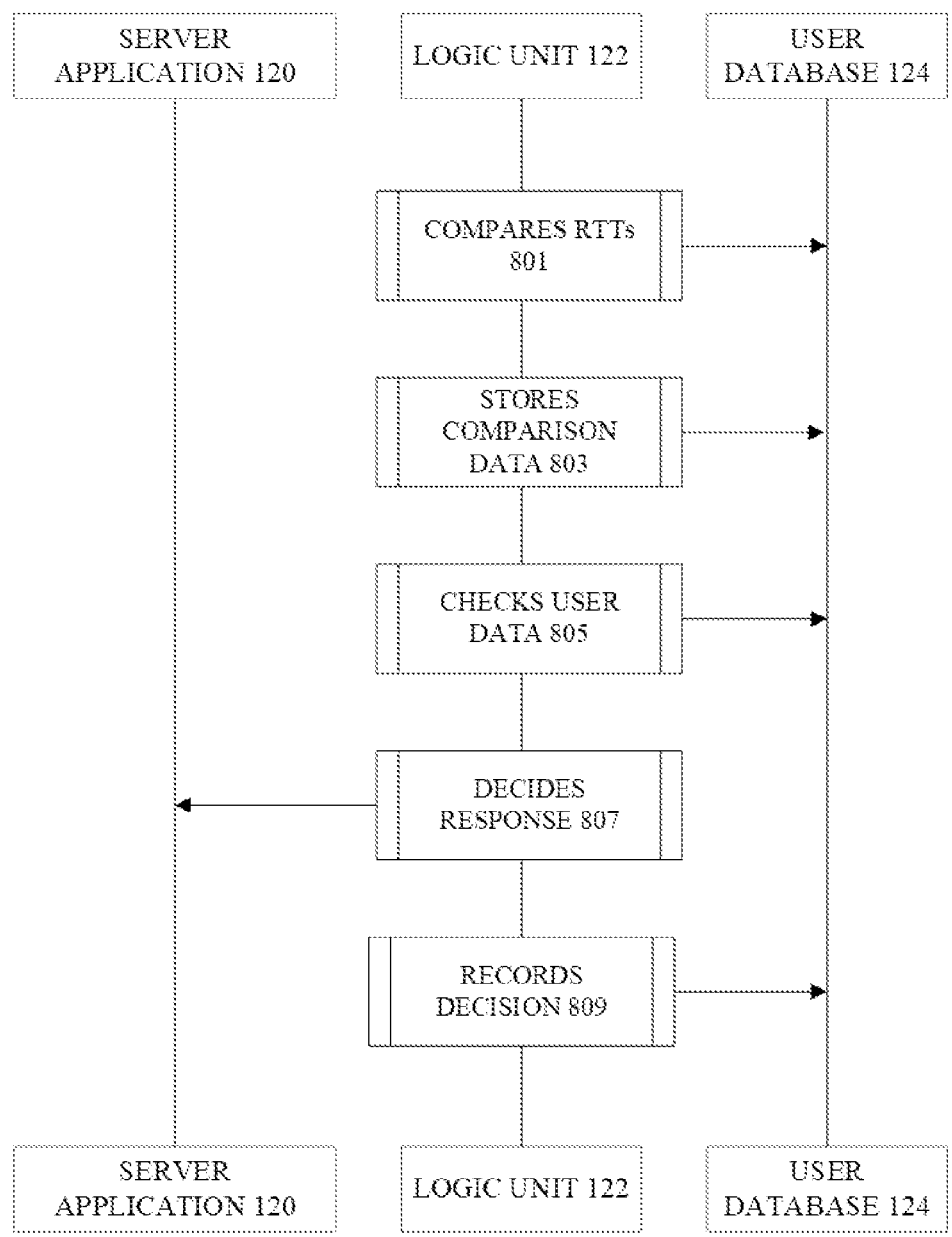
FIG. 8 shows an exemplary flow diagram of RTT comparison and decision making within a web server.

FIG. 8 represents an exemplary flow diagram of RTT comparison and decision making within a web server. The processes described herein can be synchronous with processes described in FIGS. 2, 3, 4, and 5. This means that the internal functionality of Web Server 112 can happen at the same time that various ping messages are traveling through Network 110 and being processed in any external elements.

In step 801, Logic Unit 122 compares RTTs with each other. This comparison can be made among different types of RTTs, like HTTP/2 ping and ICMP ping or HTTP/3 QUIC ping and ICMP ping, or it can be made among RTTs of the same type but done at different timestamps, like different ICMP pings or HTTP/2 pings or HTTP/3 QUIC pings.

Although a broad notion of "comparing" is used, it can designate various arithmetic operations done with the provided RTTs. A simple instance of comparing is subtracting one RTT from another. However, more advanced techniques can be employed to mitigate inaccuracies and statistical abbreviations. For example, HTTP/2 and HTTP/3 QUIC pings can have a slightly longer RTT because encryption and decryption processes happen at both hosts. Logic Unit 122 can employ calculations to account for the increase of RTT by subtracting the expected encryption time from the total RTT before comparing different RTTs.

Additionally, Logic Unit 122 can produce statistical aggregated data from a range of RTTs done at controlled intervals. For example, it can calculate the mean, median or mode aggregates from a range of data for any type of RTT and compare them. The calculation performed by Logic Unit 122 may comprise computational models such as neural networks, classification or regression trees, support vector machines, logistic regressors, Gaussian process models, or other computational models. Logic Unit 122 can decide the suitable coefficients, loads, groupings, associations, boundaries, hyperparameters or other model traits that are utilized by the comparing process, by feeding as inputs into the comparison algorithm aggregated RTT data. In one embodiment, Logic Unit 122 receives the data necessary for comparison from User Database 124. However, in other embodiments some or all of the data can come from Server Application 120 directly.

In step 803, Logic Unit 122 stores the resulting comparison data to User Database 124. The type of data stored will depend on the comparison mechanisms used in the comparison process. It can include simple arithmetic values, mean, median, mode values as well as weighted scores.

In step 805, Logic Unit 122 checks User Database 124 for the updated data on a user that has been aggregated together with previous results. In some embodiments, Logic Unit 122 can decide to do a routine check up on user data even if no new data is being calculated. For instance, Logic Unit 122 can decide that given high server load, users with a low weighted score should receive reduced service or no service at all. In that case, step 801 and step 803 are skipped and Logic Unit 122 performs step 805 directly to retrieve user data from User Database 124 in order to make a decision.

In some embodiments, Logic Unit 122 can additionally check third party services for a black list or a white list of users before making a decision. The third party service can be integrated into the User Database 124 or it can be accessed via Network 110.

In step 807, Logic Unit 122 checks the collected data on a user and decides on a response that should be given to the user. Most common decisions can be grouped into three groups—"Okay" responses, "Error" responses, and "Ban" responses.

First decision group is "Okay" responses. They include decisions that allow the requested content to be returned to a user in one form or another. There can be limitations to an "Okay" response, for example, Logic Unit 122 can decide that some users have priority over others because of their weighted score. Thus, some users can receive an adjusted service level response but it can still be considered an "Okay" response since the responses reach an end user. Additionally, "Okay" response can require certain barriers to be passed by a user, like solving a CAPTCHA.

Second decision group is "Error" responses that do not service a current response but do not prevent a user from connecting or trying to connect again. Examples of "Error" response include but are not limited to returning an error message, like NO_ERROR (0x0), INTERNAL_ERROR (0x2), FLOW_CONTROL_ERROR (0x3), REFUSED_STREAM (0x7), CANCEL (0x8), CONNECT_ERROR (0xa), ENHANCE_YOUR_CALM (0xb) or similar codes that close or drop a connection.

Third decision group is "Ban" responses that drop a current connection with a user and prevent them from connecting or trying to connect again for a determinate or indeterminate period. Examples of "Ban" responses include but are not limited to blacklisting a user's IP at Firewall 116, banning user accounts and otherwise suspending their activity, for example, by continually returning HTTP error messages. It can be done for an undetermined amount of time or for a predetermined period.

Once Logic Unit 122 makes a decision, it communicates it to Server Application 120 to be enforced or enacted.

In step 809, Logic Unit 122 records the decision that was made in the User Database 124. In some embodiments, decisions might be recorded in a separate database or can be not recorded at all. However, most commonly, decisions are recorded to be consulted on a later date, for example, when a ban timer runs out or when a user connects again. User history can also be aggregated to determine whether a user has been banned in the past, what was the period and frequency of bans or instances of connection drops.

Figure 9:
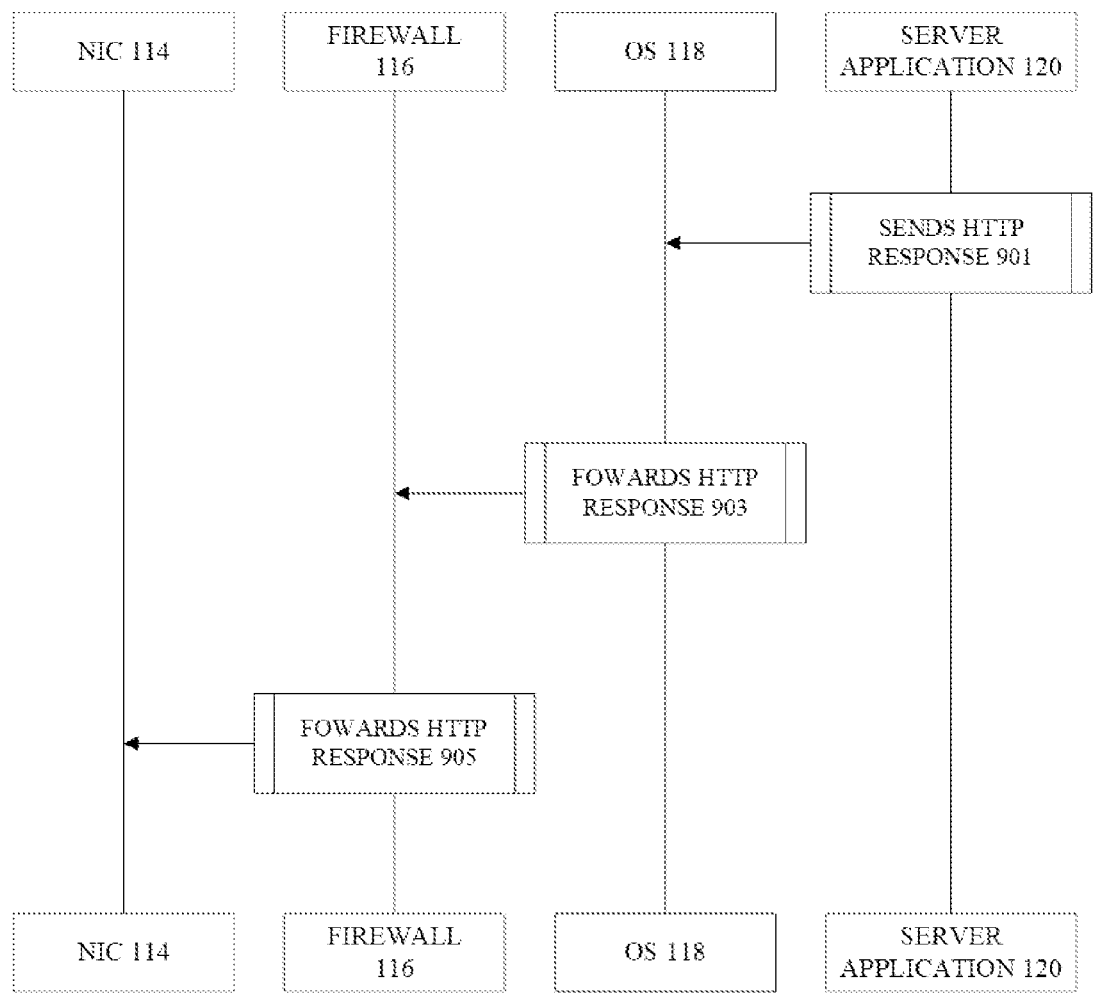
FIG. 9 shows an exemplary flow diagram of sending an HTTP response by a web server.

FIG. 9 represents an exemplary flow diagram of sending an HTTP response by a web server. The processes described herein can be synchronous with processes described in FIGS. 2, 3, 4, and 5. This means that the internal functionality of Web Server 112 can happen at the same time that various ping messages are traveling through Network 110 and being processed in any external elements. It is assumed that there is prior communication between Web Server 112 and User Device 102 such that an IP address of a last-mile proxy is known and there is an HTTP/2 or HTTP/3 QUIC connection active between Web Server 112 and User Device 102.

In step 901, if the decision in the "Okay" or "Error" decision groups, Server Application 120 formulates and sends an HTTP response to OS 118. "Okay" decision group responses include but are not limited to successful content fetching and CAPTCHA requests. "Error" decision group responses include but is not limited to NO_ERROR (0x0), INTERNAL_ERROR (0x2), FLOW_CONTROL_ERROR (0x3), REFUSED_STREAM (0x7), CANCEL (0x8), CONNECT_ERROR (0xa), ENHANCE_YOUR_CALM (0xb) or similar codes that close or drop a connection. Server Application 120 forwards the decided response to OS 118.

In step 903, OS 118 receives the response from Server Application 120 and forwards it to Firewall 116 to be communicated through Network 110. Firewall 116 can also perform a routine filtering of network traffic, although since responses are mostly communicated through an already established HTTP/2 connection, it is generally the case that the response will not be filtered out.

In step 905, NIC 114 receives the response from OS 118 and relays it over Network 110.

Figure 10:
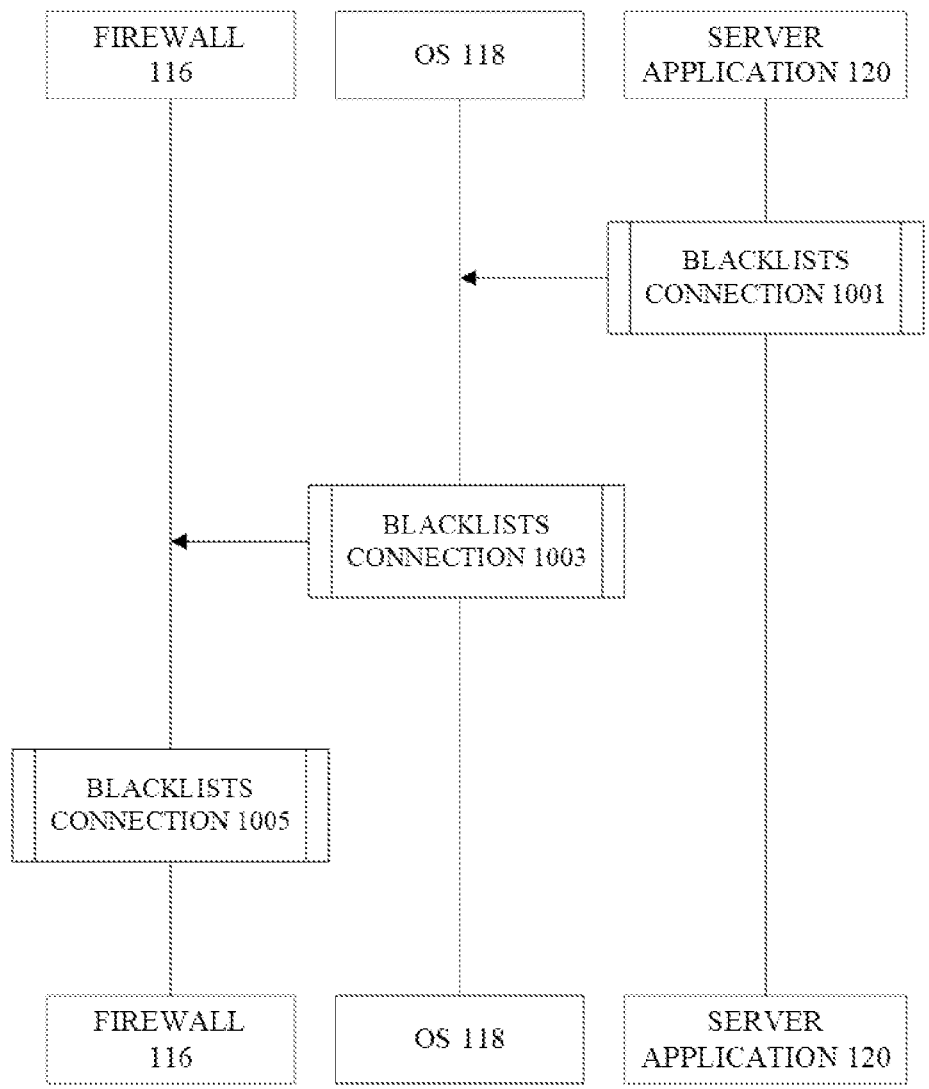
FIG. 10 shows an exemplary flow diagram of blacklisting a user by a web server.

FIG. 10 represents an exemplary flow diagram of blacklisting a user by a web server. The processes described herein can be synchronous with processes described in FIGS. 2, 3, 4, and 5. This means that the internal functionality of Web Server 112 can happen at the same time that various ping messages are traveling through Network 110 and being processed in any external elements. It is assumed that there is prior communication between Web Server 112 and User Device 102 such that an IP address of a last-mile proxy is known and there is an HTTP/2 or HTTP/3 QUIC connection active between Web Server 112 and User Device 102.

In step 1001, Server Application 120 communicates a decision in the "Ban" decision group. This means that a user or an IP address will be banned from further connection attempts. The ban can be indeterminate or have a preset period of validity. Server Application 120 communicates a "Ban" decision to OS 118.

In step 1003, OS 118 receives the "Ban" decision from Server Application 120 and forwards it to Firewall 116.

In step 1005, Firewall 116 receives the "Ban" decision from OS 118 and adds the banned user or their IP address to a blacklist that will be filtered out through any further network communications for an indeterminate or a preset period of time.

Figure 11:
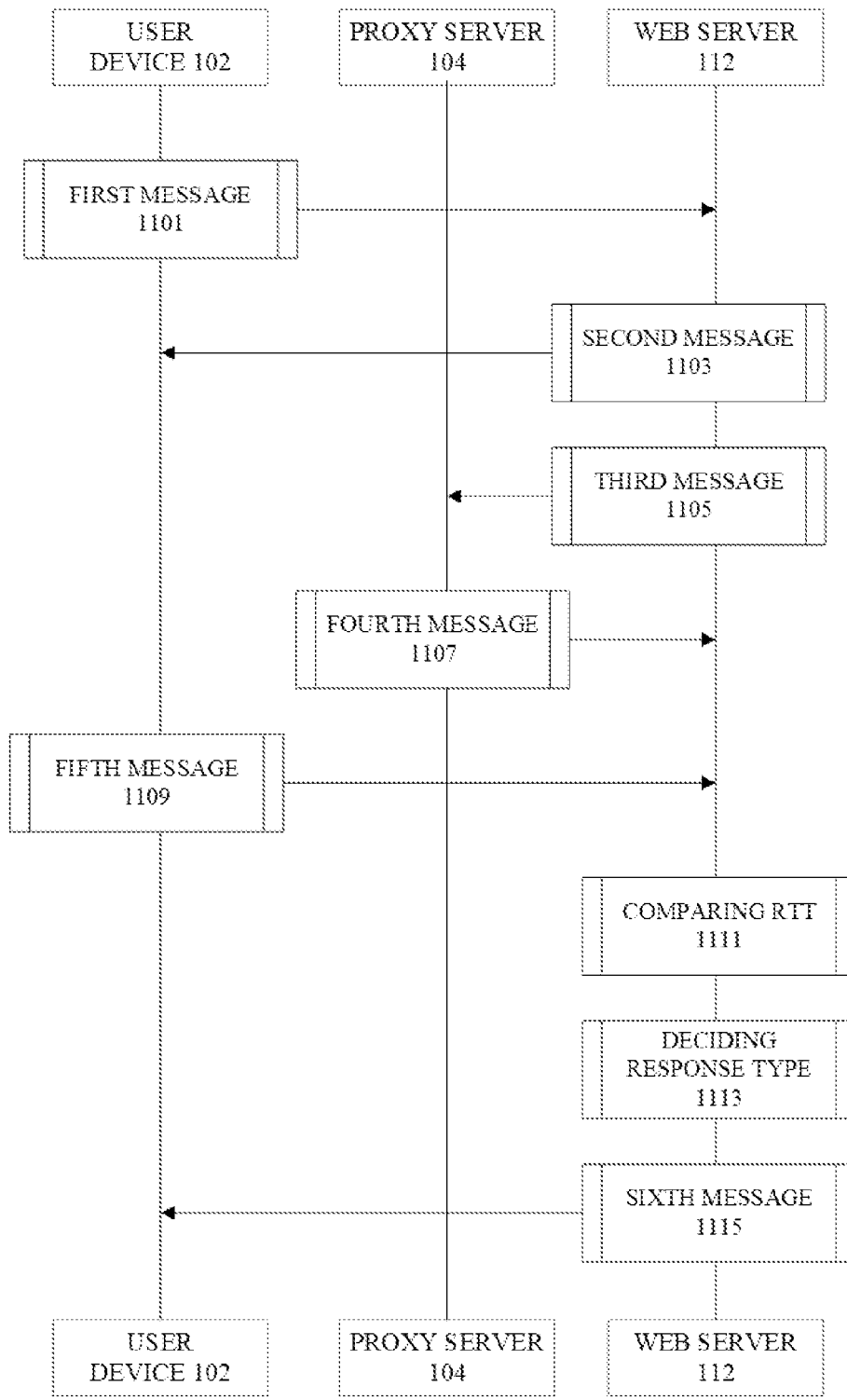
FIG. 11 shows an exemplary flow diagram of message exchange between a web server, a proxy, and a user device and a reasoning flow of a web server.

FIG. 11 represents an exemplary flow diagram of message exchange between a web server, a proxy, and a user device and a reasoning flow of a web server.

In step 1101, Web Server 112 receives a first message from a User Device 102 through a HTTP/2 or HTTP/3 QUIC connection.

In step 1103, Web Server 112 sends to a User Device 102 an encrypted second message using an HTTP/2 or HTTP/3 QUIC ping.

In step 1105, Web Server 112 sends to an IP address of the first message a third message using an ICMP echo request.

In step 1107, Web Server 112 receives a fourth message from an IP address of the first message using ICMP echo reply.

In step 1109, Web Server 112 receives a fifth message from the User Device 102 using HTTP/2 ping with the ACK flag or HTTP/3 QUIC pong.

In step 1111, Web Server 112 compares a round trip time (RTT) of second and fifth messages with the RTT of third and fourth messages.

In step 1113, Web Server 112 decides on a response type to the User Device 102 based on the RTT comparison.

In step 1115, Web Server 112 sends a sixth message containing the response type to the User Device 102 through an HTTP/2 or HTTP/3 QUIC connection.

Figure 12:
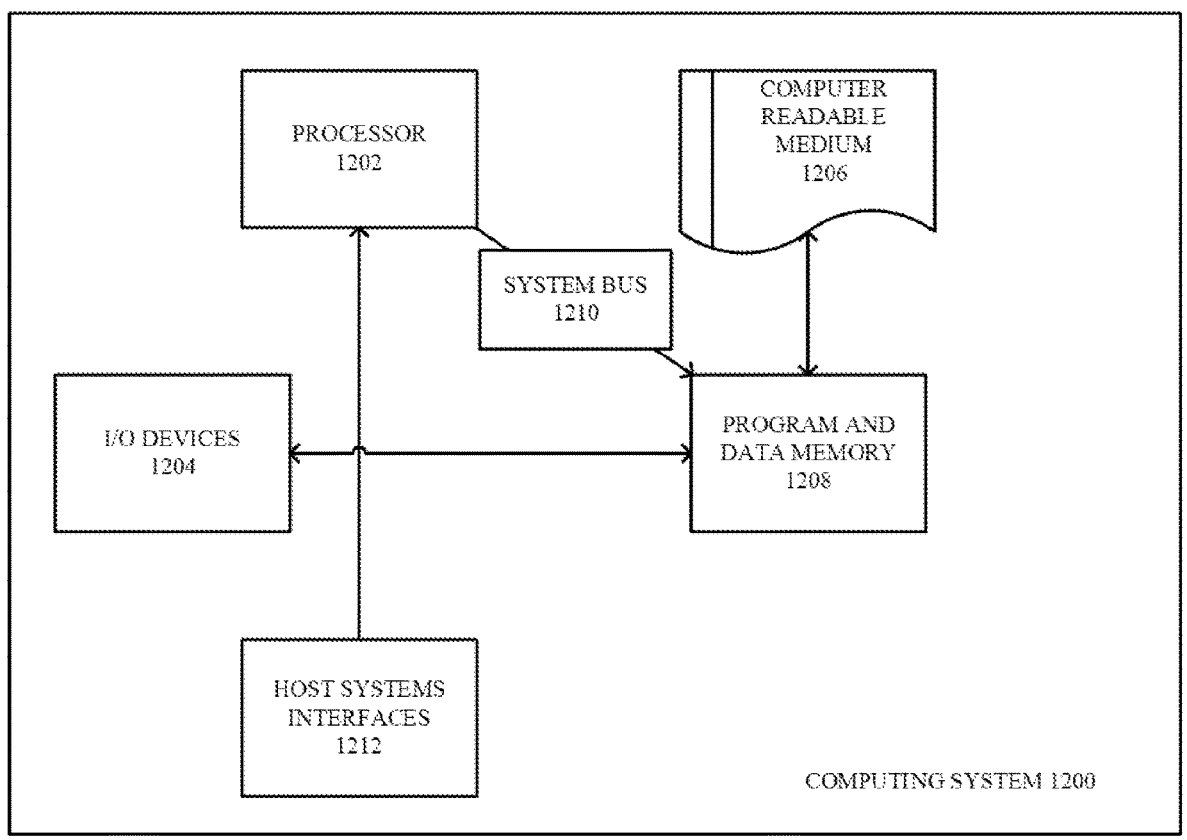
FIG. 12 shows a block diagram of an exemplary computing system.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 12 illustrates a computing system 1200 in which a computer readable medium 1206 may provide instructions for performing any of the methods and processes disclosed herein.

Furthermore, some aspects of the embodiments herein can take the form of a computer program product accessible from the computer readable medium 1206 to provide program code for use by or in connection with a computer or any instruction execution system. For the purposes of this description, the computer readable medium 1206 can be any apparatus that can tangibly store the program code for use by or in connection with the instruction execution system, apparatus, or device, including the computing system 1200.

The computer readable medium 1206 can be any tangible electronic, magnetic, optical, electromagnetic, infrared, or semiconductor system (or apparatus or device). Some examples of a computer readable medium 1206 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 1200 can include one or more processors 1202 coupled directly or indirectly to memory 1208 through a system bus 1210. The memory 1208 can include local memory employed during actual execution of the program code, bulk storage, and/or cache memories, which provide temporary storage of at least some of the program code in order to reduce the number of times the code is retrieved from bulk storage during execution.

Input/output (I/O) devices 1204 (including but not limited to keyboards, displays, pointing devices, I/O interfaces, etc.) can be coupled to the computing system 1200 either directly or through intervening I/O controllers. Network adapters may also be coupled to the computing system 1200 to enable the computing system 1200 to couple to other data processing systems, such as through host systems interfaces 1212, printers, and/or or storage devices through intervening private or public networks. Modems, cable modems, and Ethernet cards are just examples of network adapter types.

The disclosure presents a method, a system and a non-transitory computer-readable medium to detect a Proxy server by a Web server comprising: receiving a first message from a User device by the Web server through an HTTP/2 or HTTP/3 QUIC connection; sending by a Web server to a User device an encrypted second message using an HTTP/2 or HTTP/3 QUIC ping; sending by the Web server to an IP address of the first message a third message using an ICMP echo request; receiving by the Web Server a fourth message from an IP address of the first message using ICMP echo reply; receiving by a Web Server a fifth message from the User Device using HTTP/2 ping with the ACK flag or HTTP/3 QUIC pong; comparing by the Web Server a round trip time (RTT) of second and fifth messages with the RTT of third and fourth messages; deciding by the Web Server [on] a response type to the User Device based on the RTT comparison; sending by the Web Server a sixth message containing the response type to the User Device through HTTP/2 or HTTP/3 QUIC connection.

In the disclosure a second and third messages can be sent and received independently from each other at any time intervals and in any order.

The round trip time comparison comprises at least one of the following: storing ICMP RTT and HTTP/2 or HTTP/3 RTT; aggregating ICMP RTT and HTTP/2 or HTTP/3 RTT; compensating HTTP/2 RTT or HTTP/3 RTT for encryption time.

In the disclosure storing ICMP RTT and HTTP/2 or HTTP/3 RTT includes timestamps and time lengths of round trip times.

In the disclosure aggregating ICMP RTT and HTTP/2 or HTTP/3 RTT includes at least one of the following: grouping data in categories; forming ordered, partially ordered or unordered series of data; performing statistical analysis; running machine learning and deep learning algorithms; forming predictive models.

In the disclosure after performing the analysis, the Web Server can decide to send the following response types based on ICMP RTT and HTTP/2 or HTTP/3 RTT: Okay response; Error response; Ban response. Okay response means returning the requested content. Error response includes at least one of the following: returning an HTTP error message; dropping the connection; requesting to solve a CAPTCHA. Ban response type means blacklisting an IP address at a Web Server firewall or continually sending HTTP error responses. Banning a user can take an indefinite or definite amount of time.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

The invention claimed is:

1. A method to detect a Proxy server by a Web server comprising:
   a. Receiving a first message from a User device by the Web server through an HTTP/2 connection or an HTTP/3 QUIC connection;
   b. Sending by the Web server to the User device an encrypted second message using an HTTP/2 ping or an HTTP/3 QUIC ping;
   c. Sending by the Web server to an Internet Protocol (IP) address of the first message a third message using an Internet Control Message Protocol (ICMP) echo request;
   d. Receiving by the Web Server a fourth message from the IP address of the first message using an ICMP echo reply;
   e. Receiving by the Web Server a fifth message from the User Device using the HTTP/2 ping with an ACK flag or an HTTP/3 QUIC pong;
   f. Comparing by the Web Server a round trip time (RTT) of the second message and the fifth message with the RTT of the third message and the fourth message;
   g. Deciding by the Web Server a response type to the User Device based on the RTT comparison;
   h. Sending by the Web Server a sixth message containing the response type to the User Device through the HTTP/2 connection or the HTTP/3 QUIC connection.

2. The method of claim 1, wherein the second message and the third message can be sent and received independently from each other at any time interval and in any order.

3. The method of claim 1, wherein RTT comparison comprises at least one of the following:
   a. Storing ICMP RTT and either HTTP/2 RTT or HTTP/3 RTT;
   b. Aggregating ICMP RTT and either HTTP/2 RTT or HTTP/3 RTT;
   c. Compensating HTTP/2 RTT or HTTP/3 RTT for encryption time.

4. The method of claim 3, wherein storing ICMP RTT and either HTTP/2 RTT or HTTP/3 RTT includes timestamps and time lengths of round trip times.

5. The method of claim 3, wherein aggregating ICMP RTT and either HTTP/2 RTT or HTTP/3 RTT includes at least one of the following:
   a. grouping data in categories;
   b. forming ordered, partially ordered, or unordered series of data;
   c. performing statistical analysis;
   d. running machine learning and deep learning algorithms;
   e. forming predictive models.

6. The method of claim 1, wherein deciding by the Web Server the response type based on based on RTT comparison can be any of the following:
   Okay response;
   Error response;
   Ban response.

7. The method of claim 6, wherein the Okay response returns requested content.

8. The method of claim 6, wherein the Error response includes at least one of the following:

a. returning an HTTP error message;
  b. dropping the connection;
  c. requesting to solve a Completely Automated Public Turing test to tell Computers and Humans Apart (CAPTCHA).

9. The method of claim 6, wherein the Ban response type blacklists an IP address at a Web Server firewall or continually sends HTTP error responses.

10. The method of claim 9, wherein banning an IP address is implemented for a preset amount of time and expires.

11. A system to detect a Proxy server by a Web server comprising:
   at least one Proxy Server; and
   Service Provider Infrastructure operable to perform at least the following actions:
      a. Receiving a first message from a User device by the Web server through an HTTP/2 connection or an HTTP/3 QUIC connection;
      b. Sending by the Web server to the User device an encrypted second message using an HTTP/2 ping or an HTTP/3 QUIC ping;
      c. Sending by the Web server to an Internet Protocol (IP) address of the first message a third message using an Internet Control Message Protocol (ICMP) echo request;
      d. Receiving by the Web Server a fourth message from the IP address of the first message using an ICMP echo reply;
      e. Receiving by the Web Server a fifth message from the User Device using the HTTP/2 ping with an ACK flag or HTTP/3 QUIC pong;
      f. Comparing by the Web Server a round trip time (RTT) of the second message and the fifth message with the RTT of the third message and the fourth message;
      g. Deciding by the Web Server a response type to the User Device based on the RTT comparison;
      h. Sending by the Web Server a sixth message containing the response type to the User Device through the QUIC HTTP/2 connection or the HTTP/3 QUIC connection.

12. The system of claim 11, wherein the second message and the third message can be sent and received independently from each other at any time interval and in any order.

13. The system of claim 11, wherein RTT comparison comprises at least one of the following:
   a. Storing ICMP RTT and either HTTP/2 RTT or HTTP/3 RTT;
   b. Aggregating ICMP RTT and either HTTP/2 RTT or HTTP/3 RTT;
   c. Compensating HTTP/2 RTT or HTTP/3 RTT for encryption time.

14. The system of claim 11, wherein aggregating ICMP RTT and either HTTP/2 RTT or HTTP/3 RTT includes at least one of the following:
   a. grouping data in categories;
   b. forming ordered, partially ordered, or unordered series of data;
   c. performing statistical analysis;
   d. running machine learning and deep learning algorithms;
   e. forming predictive models.

15. The system of claim 11, wherein deciding by the Web Server the response type based on based on RTT comparison can be any of the following:
   Okay response;
   Error response;
   Ban response.

16. A non-transitory computer-readable medium for detecting a Proxy server by a Web server comprising instructions which, when executed by a computer device, causes the computer device to:
   a. Receive a first message from a User device by the Web server through an HTTP/2 connection or an HTTP/3 QUIC connection;
   b. Send by the Web server to the User device an encrypted second message using an HTTP/2 ping or an HTTP/3 QUIC ping;
   c. Send by the Web server to an Internet Protocol (IP) address of the first message a third message using an Internet Control Message Protocol (ICMP) echo request;
   d. Receive by the Web Server a fourth message from the IP address of the first message using an ICMP echo reply;
   e. Receive by the Web Server a fifth message from the User Device using the HTTP/2 ping with an ACK flag or an HTTP/3 QUIC pong;
   f. Compare by the Web Server a round trip time (RTT) of the second message and the fifth message with the RTT of the third message and the fourth message;
   g. Decide by the Web Server a response type to the User Device based on the RTT comparison;
   h. Send by the Web Server a sixth message containing the response type to the User Device through the HTTP/2 connection or the HTTP/3 QUIC connection.

17. The non-transitory computer-readable medium of claim 16, wherein the second message and the third message can be sent and received independently from each other at any time interval and in any order.

18. The non-transitory computer-readable medium of claim 16, wherein RTT comparison comprises at least one of the following:
   a. Storing ICMP RTT and either HTTP/2 RTT or HTTP/3 RTT;
   b. Aggregating ICMP RTT and either HTTP/2 RTT or HTTP/3 RTT;
   c. Compensating HTTP/2 RTT or HTTP/3 RTT for encryption time.

19. The non-transitory computer-readable medium of claim 16, wherein deciding by the Web Server the response type based on RTT comparison can be any of the following:
   Okay response;
   Error response;
   Ban response.

* * * * *